United States Patent
Kim et al.

(10) Patent No.: US 10,999,636 B1
(45) Date of Patent: *May 4, 2021

(54) VOICE-BASED CONTENT SEARCHING ON A TELEVISION BASED ON RECEIVING CANDIDATE SEARCH STRINGS FROM A REMOTE SERVER

(71) Applicant: Amazon Technologies, Inc., Seattle, WA (US)

(72) Inventors: Richard W. Kim, San Ramon, CA (US); Radhika Suresh Karandikar, Sunnyvale, CA (US); Aaron Nicholas Olsen, San Jose, CA (US); James Shu, San Jose, CA (US); Shinji Kimura, San Francisco, CA (US); Xin Wang, San Mateo, CA (US)

(73) Assignee: Amazon Technologies, Inc., Seattle, WA (US)

( * ) Notice: Subject to any disclaimer, the term of this patent is extended or adjusted under 35 U.S.C. 154(b) by 901 days.

This patent is subject to a terminal disclaimer.

(21) Appl. No.: 14/537,893

(22) Filed: Nov. 10, 2014

Related U.S. Application Data

(60) Provisional application No. 62/069,253, filed on Oct. 27, 2014.

(51) Int. Cl.
| | | |
|---|---|---|
| *G10L 15/20* | (2006.01) | |
| *H04W 88/06* | (2009.01) | |
| *H04N 21/472* | (2011.01) | |
| *G10L 15/08* | (2006.01) | |
| *H04N 21/422* | (2011.01) | |

(52) U.S. Cl.
CPC .......... *H04N 21/472* (2013.01); *G10L 15/08* (2013.01); *H04N 21/42203* (2013.01)

(58) Field of Classification Search
CPC ....... G10L 15/265; G10L 15/20; G10L 15/22; H04W 12/08; H04W 88/06; H04N 21/42203
USPC .................................. 704/275, 233; 370/338
See application file for complete search history.

(56) References Cited

U.S. PATENT DOCUMENTS

| | | |
|---|---|---|
| 8,358,749 B2 | 1/2013 | Chang et al. |
| 8,412,532 B2 | 4/2013 | Gruenstein et al. |
| 8,543,397 B1 | 9/2013 | Nguyen |
| 8,634,390 B2 | 1/2014 | Ramakrishnan et al. |
| 8,767,694 B2 * | 7/2014 | Yablokov ............... H04W 12/08 370/338 |

(Continued)

*Primary Examiner* — Farzad Kazeminezhad
(74) *Attorney, Agent, or Firm* — Eversheds Sutherland (US) LLP

(57) ABSTRACT

Systems, methods, and computer-readable media are disclosed for voice-based content searching. The systems, methods, and computer-readable media described herein may improve user experiences by providing voice-based content searching using mobile devices. In an example method described herein, a computer system may receive a voice search initiation signal from a mobile device over a WiFi protocol connection or a Bluetooth protocol connection. The computer system may monitor a WiFi receiver and a Bluetooth receiver of the computer system for first voice data. The computer system may determine that the first voice data is being received at the WiFi receiver. The computer system may determine that second voice data is received at the Bluetooth receiver while the first voice data is being received at the WiFi receiver, and discard the second voice data.

16 Claims, 11 Drawing Sheets

(56) References Cited

U.S. PATENT DOCUMENTS

| | | |
|---|---|---|
| 2009/0081950 A1 | 3/2009 | Matsubara |
| 2010/0081476 A1 | 4/2010 | Markiewicz et al. |
| 2011/0059768 A1* | 3/2011 | Pandruvada .......... H04W 88/06 455/552.1 |
| 2011/0289530 A1 | 11/2011 | Dureau et al. |
| 2011/0307253 A1* | 12/2011 | Lloyd .................... G10L 15/20 704/233 |
| 2012/0042343 A1 | 2/2012 | Laligand et al. |
| 2014/0331135 A1 | 11/2014 | Sukoff |
| 2015/0382047 A1* | 12/2015 | Van Os .................. G10L 15/22 725/38 |

* cited by examiner

VOICE-BASED CONTENT SEARCHING ON A TELEVISION BASED ON RECEIVING CANDIDATE SEARCH STRINGS FROM A REMOTE SERVER

RELATED APPLICATIONS

This patent application claims the benefit of U.S. Provisional Patent Application No. 62/069,253, filed Oct. 27, 2014, and titled "VOICE-BASED CONTENT SEARCHING", which is hereby incorporated by reference in its entirety.

BACKGROUND

Users may view or otherwise consume content on televisions or other content consumption devices. In order to identify and select content, the user may desire to be presented with content selection options that meet one or more specified search criteria. The user may provide the search criteria using devices capable of communicating with other devices in accordance with different communication protocols.

BRIEF DESCRIPTION OF THE DRAWINGS

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. The use of the same reference numerals indicates similar, but not necessarily the same or identical components. Different reference numerals may be used to identify similar components as well. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Overview

Figure 1:
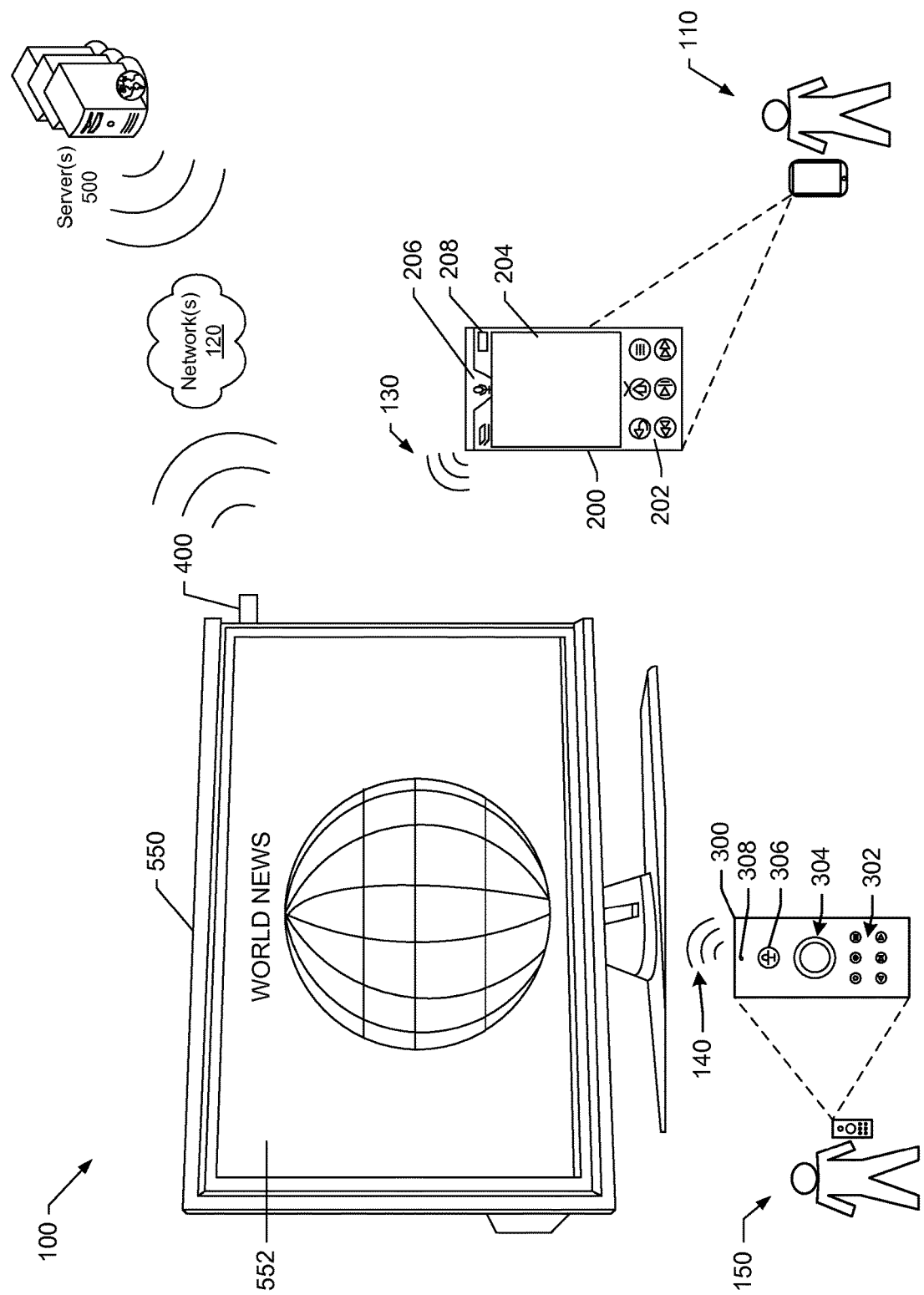
FIGS. 1-4 are schematic diagrams of example use cases and device configurations in accordance with one or more example embodiments of the disclosure.

This disclosure relates to, among other things, systems, methods, computer-readable media, techniques, and methodologies for voice-based content searching. In an example embodiment, voice-based content searching, as described herein, may be facilitated by a client device, such as a mobile device, configured to communicate with a media output device that is, in turn, configured to present or direct the presentation of content to a user. The mobile device may transmit voice data to the media output device over a wireless communication protocol. The media output device may be configured to receive voice data from different mobile devices over multiple wireless communication protocols, thereby allowing multiple mobile devices to transmit voice data to the media output device. In some embodiments, the media output device may be configured to monitor multiple wireless communication receivers for voice data simultaneously or at least partially concurrently. The media output device may be configured to receive first voice data from a mobile device over a first wireless communication protocol, such as WiFi, while discarding second voice data received over a second wireless communication protocol, such as Bluetooth, where the second voice data is received while the first voice data is being received.

The user may view content on a content providing device, including, but not limited to, a viewing device such as a television, a laptop computer, a tablet, a computer monitor, or the like, and/or devices configured to provide audio content, such as a speaker-type device, including, but not limited to, music, audio books, machine voice responses, spoken text, and/or any other type of audio output. In certain example embodiments, a media output device, such as a media streaming device, configured to communicate with a mobile device such as a smartphone may itself be a content providing device or may communicate with a content providing device via a wired or wireless connection. A content providing device or a media output device may also be referred to herein as a content consumption device. Further, a media output device may be a media streaming device configured to facilitate streaming of remotely stored content and/or presentation of locally stored content.

In certain example embodiments, a mobile application that is configured to communicate with a media output device may be launched on a mobile device. A user may provide analog sound input (e.g., voice) to the mobile application, and the mobile device may generate digital voice data representative of the analog sound input and transmit the digital data to the media output device over a wireless communication protocol. The media output device may receive the voice data and may transmit the voice data to a first group of one or more remote servers which may, in turn, process the data to determine a meaning of the sound input and to identify candidate search options based thereon, which may include a set of candidate search strings. The media output device may receive the identified candidate search options or search strings from the first group of remote server(s) and may present information associated with the candidate search options to the user on either or both the mobile device and the viewing device. The user may select one of the presented search options, and the media output device may receive an indication of the selection of one of the set of candidate search strings or search options. The media output device may transmit the selected one of the search options to a second group of one or more remote servers. The second group of server(s) may include one or more servers from the first group. The media output device may receive a set of search results that may include content selection options based at least in part on the selected search option. Metadata associated with the content selection options (e.g., title, plot summary, etc.) may be communicated to the media output device, which may direct presentation of the metadata via a display of the mobile device or a display of a separate viewing device, such as a television, with which the media output device is configured to communicate.

In certain example embodiments, the mobile device may include a microphone configured to receive sound input in the form of analog sound and may generate electrical signals indicative of the analog sound. Processing circuitry of the mobile device may convert the analog sound to digital voice data using an analog-to-digital converter (ADC). In certain example embodiments, the mobile device may present a voice search button or other widget for initiating a voice search via a user interface of a mobile application executing on the mobile device. The voice search button may include a soft-pull feature that allows the user to apply a drag-and-hold gesture on the voice search button to initiate sound input detection. In order to replicate the look and feel or general user experience of a press and hold physical button, haptic feedback may be provided as the user performs a drag-and-hold operation on the voice search button. A drag-and-hold gesture may refer to a gesture whereby a user performs a swipe gesture and maintains contact with a touch-sensitive display for some predetermined period of time before ceasing contact. In certain example embodiments, while a drag-and-hold gesture is being performed on the voice search button, the mobile device may activate a microphone. The user may speak voice commands that are detected by the microphone. Upon release of the voice search button, the microphone may cease capture of sound input and may return to an initial position in the user interface. In addition, an indication may be provided that the sound input has been wirelessly transmitted to a media output device or other device for processing of the sound input. Haptic feedback and/or voice visualization feedback may also be provided to the user during or subsequent to capture of sound input.

The mobile device may utilize the ADC to generate digital voice data from the analog sound input, and may transmit the voice data to a media output device in accordance with a suitable communication protocol including, for example, a local area network (LAN) wireless communication protocol such as WiFi, Wi-Fi Direct, or a personal area network (PAN) such as Bluetooth™, or another wireless communication protocol as described herein. The media output device may, in turn, transmit the voice data to one or more remote servers. The remote server(s) may perform natural language processing (or other speech recognition processing) on the voice data to determine a meaning of the corresponding sound input detected by the microphone and may identify candidate search options or candidate search strings from which the user can select to initiate a content search. Processing the voice data may include generating speech-to-text translations of the data. Based at least in part on the user selection of the candidate search options, the remote server(s) may identify search results, which may include content selection options. In certain example embodiments, the media output device may perform the processing on the voice data and may transmit results of the processing to the remote server(s).

The search results and/or content selection options identified as part of the voice-based searching functionality described herein may include one or more content items (e.g., movies) identified as having a threshold level of relevance to the processed voice data (e.g., a speech-to-text translation of the data). The remote server(s) may transmit the search results, or in some instances, content selection options, to the media output device in the form of metadata associated with the content selection options. The media output device may then transmit the metadata for presentation via the mobile device or via a separate viewing device (e.g., a television). The metadata associated with a particular movie, for example, may include, without limitation, a title of the content item, plot summary information, actor/character information, and so forth. In alternative example embodiments, the remote server(s) may bypass the media output device and transmit the search results, or in some instances, content selection options, directly to the mobile device. In example embodiments in which the search results (e.g., the content item metadata) are displayed only on the mobile device, the user may continue viewing content on the viewing device uninterrupted by presentation of the search results on the mobile device. The user may be provided with the ability to select a particular content item for viewing or to obtain additional information with respect to the content item. Selected content may be displayed on one or both of the viewing device or the mobile device.

Illustrative Use Cases and Device Configurations

Referring generally to FIGS. 1-4, an overview of an example system 100 in accordance with one or more embodiments of the disclosure is depicted. The system 100 may include a first user 110 with a client device or first mobile device 200, a second user 150 with a second mobile device 300, a media output device 400, and a content providing device 550 communicatively coupled to the media output device 400. The system 100 may also include one or more remote server(s) 550 in wireless communication with the media output device 400, the content providing device 550, and/or the first and second mobile devices 200, 300 via one or more network(s) 120. The first mobile device 200 may be in bidirectional wireless communication 130 with the media output device 400, for example via a WiFi communication protocol. The second mobile device 300 may be in bidirectional wireless communication 140 with the media output device 400 over a wireless communication protocol that is different than the connection between the first mobile device 200 and the media output device 400, for example via a Bluetooth communication protocol. In other embodiments, the first and/or second mobile device 200, 300 may be in wireless communication 130, 140 with the media output device 400 via other wireless communication protocols, including, but not limited to, a Wi-Fi Direct protocol, a BLUETOOTH LE™ protocol, a Near Field Communication (NFC) protocol, or another wireless communication standard or protocol. The first and second mobile devices 200, 300 may be in wireless communication 130, 140 with the media output device 400 via different wireless communication protocols. The media output device 400 may be in wired or wireless communication with the content providing device 550, for example via a USB, USB 2.0, or USB 3.0 connection, Ethernet, HDMI, WiFi, WiFi Direct, BLUETOOTH™, BLUETOOTH LE™, NFC, or the like.

The first mobile device 200 may be any mobile device configured to receive user input, including, but not limited to, smartphones, tablets, remote controls, laptop computers, or the like. The first mobile device 200 may include one or more playback inputs 202 and a display 204. In some embodiments, the display 204 may present a user interface with the playback inputs 202 as well as additional inputs described herein. For example, the user interface presented on the display 204 of the first mobile device may include a voice search button 206 configured to facilitate voice-based content searching as described herein. The user interface of the first mobile device 200 may also include a search result designation button 208 configured to allow the first user 110 to designate whether search results of the voice-based content searching should be displayed on the content providing device 550 or the first mobile device 200, in one example. The first mobile device 200 may also include a microphone for voice or sound input, as described herein.

The second mobile device 300 may be any mobile device configured to receive user input, including, but not limited to, a remote control, smartphones, tablets, remote controls, laptop computers, or the like. In the illustrated embodiment, the second mobile device 300 may not include a display, while in other embodiments, the second mobile device 300 may include a display. The second mobile device 300 may include playback inputs 302 that are physical buttons. The second mobile device 300 may include additional inputs, such as scroll wheel 304, to facilitate playback or viewing of content. The second mobile device 300 may include a voice search button 306 configured to activate voice-based content searching when pressed, or when pressed and held. The second mobile device 300 may also include a microphone 308 configured to detect voice or sound input.

The media output device 400 may be any computing device with one or more processors and at least one memory communicatively coupled to the one or more processors. The media output device 400 may be able to receive and transmit, or send, information wirelessly, for example to and from the first mobile device 200, the second mobile device 300, the content providing device 550, and/or the remote server(s) 500. In some embodiments, as described herein, the media output device 400 may be a media streaming device configured to stream content, such as audio or visual content. In such embodiments, streaming of content may include receiving data packets and, in some instances, storing the data packets in a local buffer. The data packets received may be decoded and output as content for consumption. Accordingly, the media output device 400 may begin output of content before receiving an entirety of content data. In some embodiments, the media output device 400 may be configured to output streamed media content locally and/or at a connected device. Examples of content streams include, but are not limited to, visual content streaming such as movies, television shows, and other video content, as well as audio content streaming, such as music, audio books, and other audio content.

The remote server(s) 500 may be any server with one or more processors and one or more memory devices communicatively coupled to the one or more processors. The remote server(s) 500 may be configured to wirelessly communicate with other devices via network(s) 120. The content providing device 550 may be a viewing device such as any electronic device with a display 552 configured to display content, including, but not limited to, a television, smartphone, tablet, remote control, laptop computer, or the like. In some embodiments, the content providing device 550 may be a device configured to output audio media, such as a speaker or a speaker-type device, configured to output audio content such as music, audio books, machine voice response, spoken text, and/or any other type of audio. The content providing device 550 may include a microphone configured to receive analog sound input. The content providing device 550 may be configured to pre-cache various audio responses to anticipated or otherwise possible questions or inquiries presented, for example, by a user via sound (e.g., voice command). Such pre-cached audio responses may include information related to weather, time, news updates, and other information or requests and the like, that may be pre-loaded into memory. In some embodiments, the memory may become filled, and such embodiments may utilize aspects of the present disclosure to facilitate communication from users. In embodiments where the content providing device 550 does not have a local display, the content providing device 550 may be connected to a remote display.

In FIG. 1, the first user 110 may be consuming content on the content providing device 550 and may desire to consume alternate content. The first user 110 may use the first mobile device 200 to search for alternate content. The first user 110 may initiate a voice-based search function on the first mobile device 200 by dragging and holding the voice search button 206 presented on the display 204 of the first mobile device 200. The first mobile device 200 may transmit a voice search initiation signal to the media output device 400. The media output device 400 may receive the voice search initiation signal and may monitor one or more wireless connections, such as both of the WiFi connection 130 and the Bluetooth connection 140, for voice data from connected mobile devices. In other embodiments, the voice search initiation signal may be transmitted from the second mobile device 300 by the second user 150 pressing the voice button 306, in which case the media output device 400 still monitors both the WiFi connection 130 and the Bluetooth connection 140 for voice data from connected mobile devices. The first mobile device 200 may activate a microphone and may generate voice data based at least in part on the voice or sound input from the first user 110. The first mobile device 200 may transmit the voice data to the media output device 400 via, in this example embodiment, the WiFi connection 130. The media output device 400 may receive and store the voice data and may transmit the voice data to the remote server(s) 500. While the media output device 400 is receiving the voice data from the first mobile device 200 over the WiFi connection 130, the second user 150 may attempt to initiate a voice search or transmit voice data to the media output device 400 over the Bluetooth connection 140. The media output device 400 may discard voice data received over the Bluetooth connection 140 while receiving voice data over the WiFi connection 130 from the first mobile device 200.

In some embodiments, the media output device 400 may implement authentication processes prior to accepting voice data from a mobile device. For example, the media output device 400 may accept voice data from mobile devices on the same local area network or WiFi network as the media output device 400. In another example, the media output device 400 may generate a unique pin to present at the content providing device 550 that must be entered at a mobile device in order to establish a connection with the media output device 400. The media output device 400 may similarly implement parental controls by associating mobile devices with different levels of content access, such as access to restricted content.

The remote server(s) 500 may process the voice data and generate a set of candidate search options, such as a set of candidate search strings, based at least in part on the voice data. The remote server(s) 500 may communicate the set of candidate search options to the media output device 400 via network(s) 120.

Figure 2:
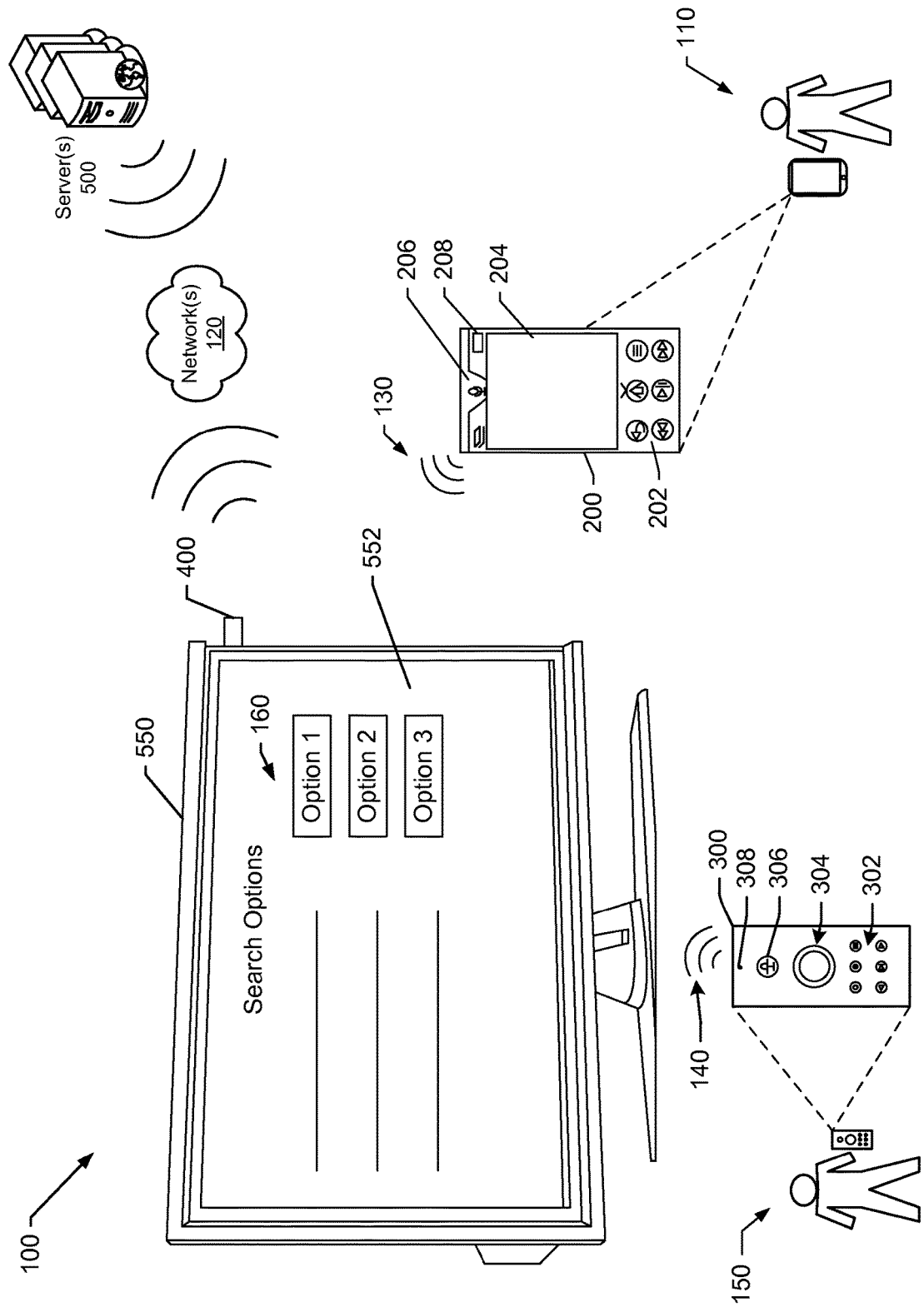

Referring now to FIG. 2, the media output device 400 may receive the set of candidate search options and may present information associated with the set of candidate search options on the content providing device 550 as one or more selectable search options 160. The selectable search options 160 may be presented as text, graphics, or in other digital forms on the display 552 of the content providing device 550. In some embodiments, the media output device 400 may communicate the set of candidate search options to the first mobile device 200 for presentation on the first mobile device 200 instead of, or in addition to, presenting the candidate search options on the content providing device 550. The first user 110 may select one of the candidate search options presented on the content providing device 550 using, for example, the first mobile device 200, or in an alternative embodiment, the second user 150 may select one of the candidate search options presented on the content providing device 550 using the second mobile device 300. The media output device 400 may receive the selection of one of the candidate search options and may transmit the selection to the remote server(s) 500 for searching. The remote server(s) 500 may receive the selection from the media output device 400 and may perform a content search to identify content relevant to the selected search option. The remote server(s) 500 may transmit identified search results to the media output device 400.

Figure 3:
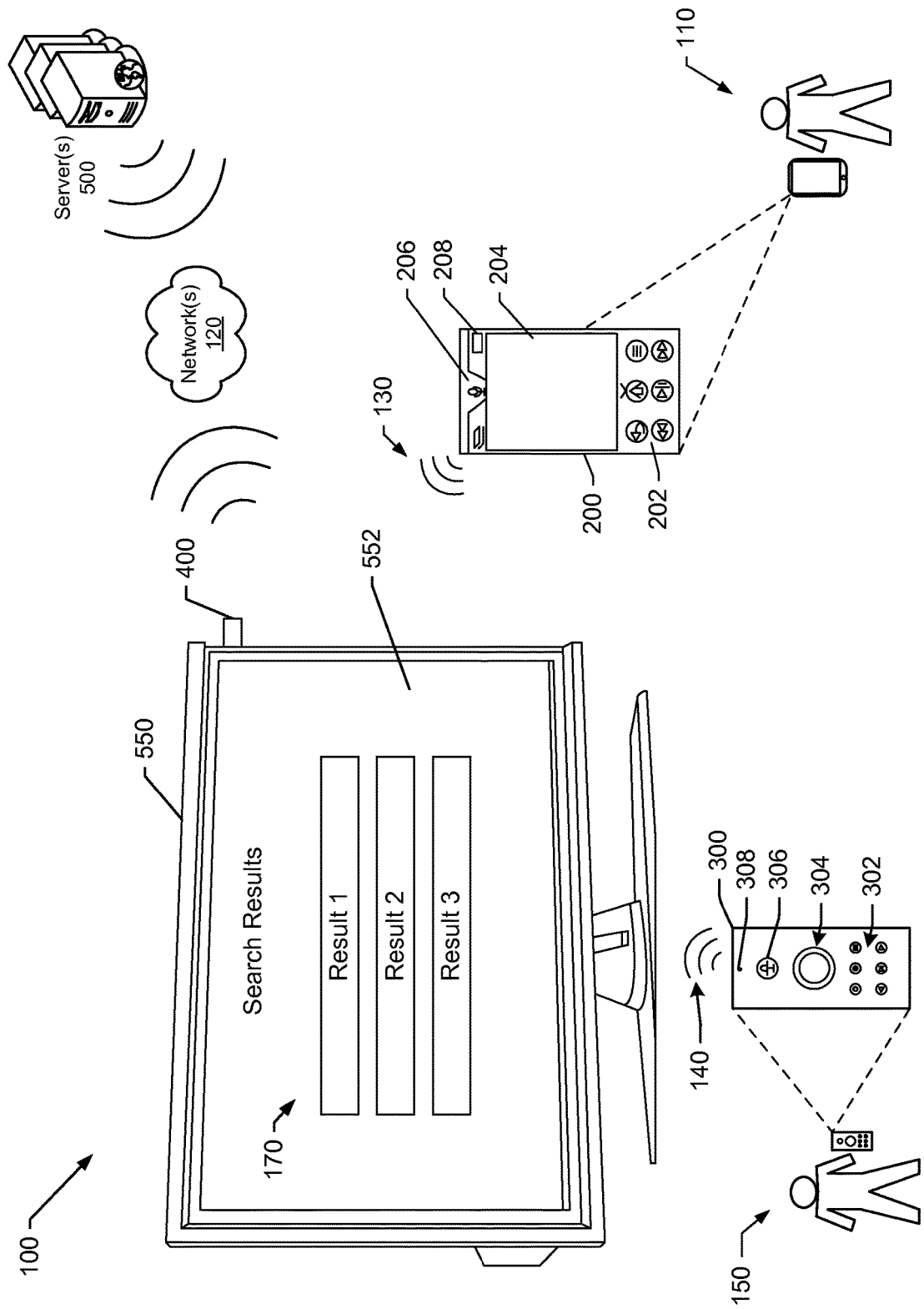

Referring now to FIG. 3, the media output device 400 may receive the search results from the remote server(s) 500 and may present the search results on the display 552 of the content providing device 550 as selectable content options 170. In some embodiments, the media output device 400 may communicate the search results and/or selectable content options 170 to the first mobile device 200 for presentation on the first mobile device 200 instead of, or in addition to, presenting the search results on the content providing device 550. The first user 110 may select one of the search results or selectable content options 170 using the first mobile device 200. In some embodiments, the second user 150 may select one of the search results or selectable options 170 using the second mobile device 300. The media output device 400 may receive the selection from the first user 110, and may retrieve content, either remote or local, associated with the selected search result for presentation on the content providing device 550. The first user 110 and/or the second user 150 may consume the content on the content providing device 550.

Figure 4:
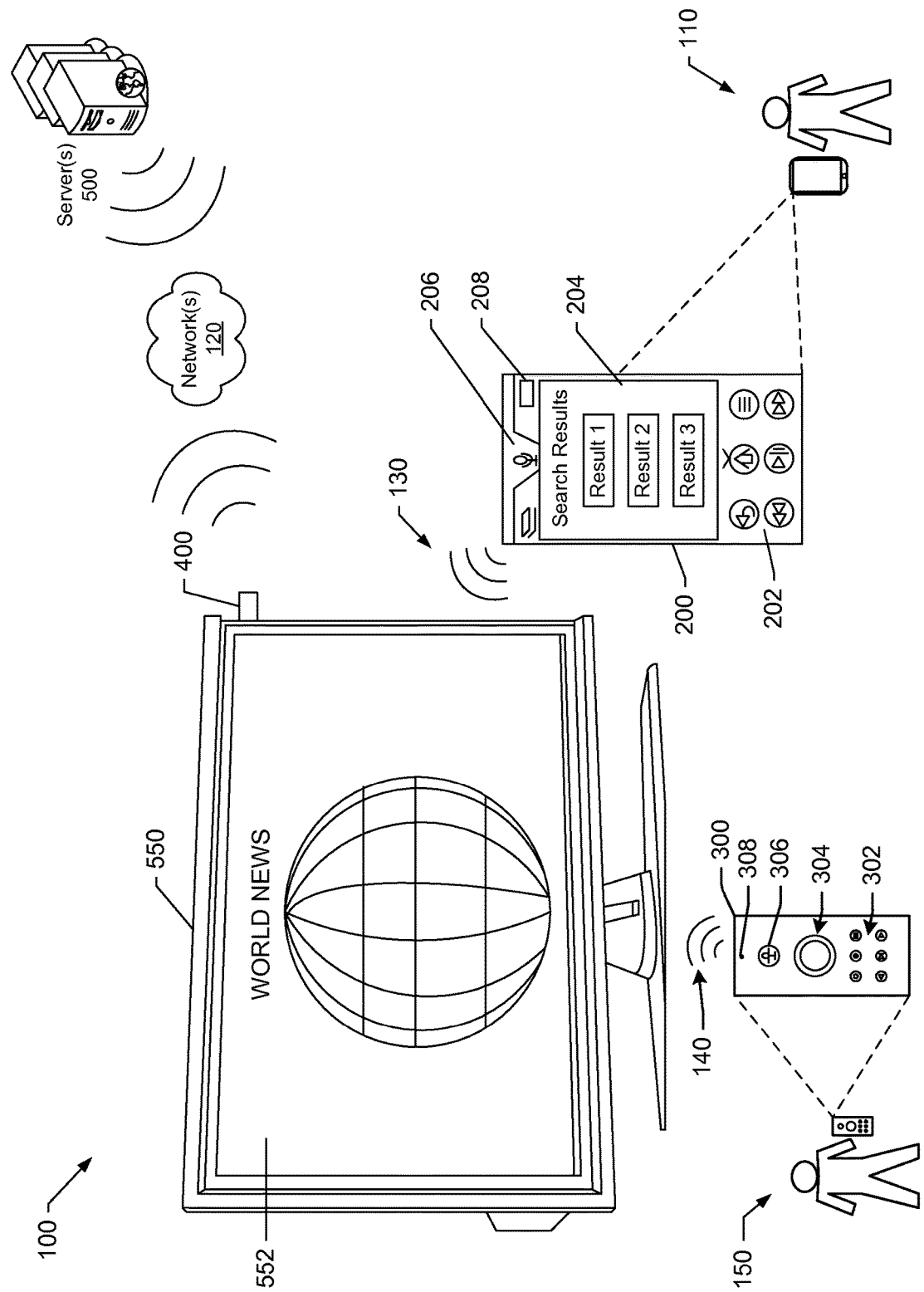

Referring now to FIG. 4, another example embodiment of the system 100 is depicted. In the illustrated embodiment, users may continue consuming content on the content providing device 550 while the first user 110 performs a voice-based content search on the first mobile device 200. In this embodiment, the media output device 400 may receive a voice search initiation signal from either the first mobile device 200 over the WiFi connection 130, or the second mobile device 300 over the Bluetooth connection 140. The first user 110 may use the first mobile device 200 to transmit voice data to the media output device 400, which may receive the voice data while continuing to present content on the content providing device 550. The media output device 400 may transmit a set of candidate search options to the first mobile device 200 for presentation, instead of presenting the candidate search options on the content providing device 550, such that content can be simultaneously presented. The first user 110 may select a search option, and search results may be presented on the first mobile device 200 as shown in FIG. 4, while content is presented on the content providing device 550. The embodiment of FIG. 4 may allow for asynchronous content searching while consuming content on the content providing device 550.

One or more illustrative embodiments of the disclosure have been described above. The above-described embodiments are merely illustrative of the scope of this disclosure and are not intended to be limiting in any way. Accordingly, variations, modifications, and equivalents of embodiments disclosed herein are also within the scope of this disclosure. The above-described embodiments and additional and/or alternative embodiments of the disclosure will be described in detail hereinafter through reference to the accompanying drawings.

While FIGS. 1-4 illustrate example systems for implementing the disclosed techniques, it is to be appreciated that multiple other devices, system, or system/device architectures may implement the described techniques. Moreover, the operations described above for the systems shown in FIGS. 1-4 are not limiting and many variations and/or additional functions of the described system are contemplated within the scope of this disclosure.

Illustrative System Architecture

Figure 5:
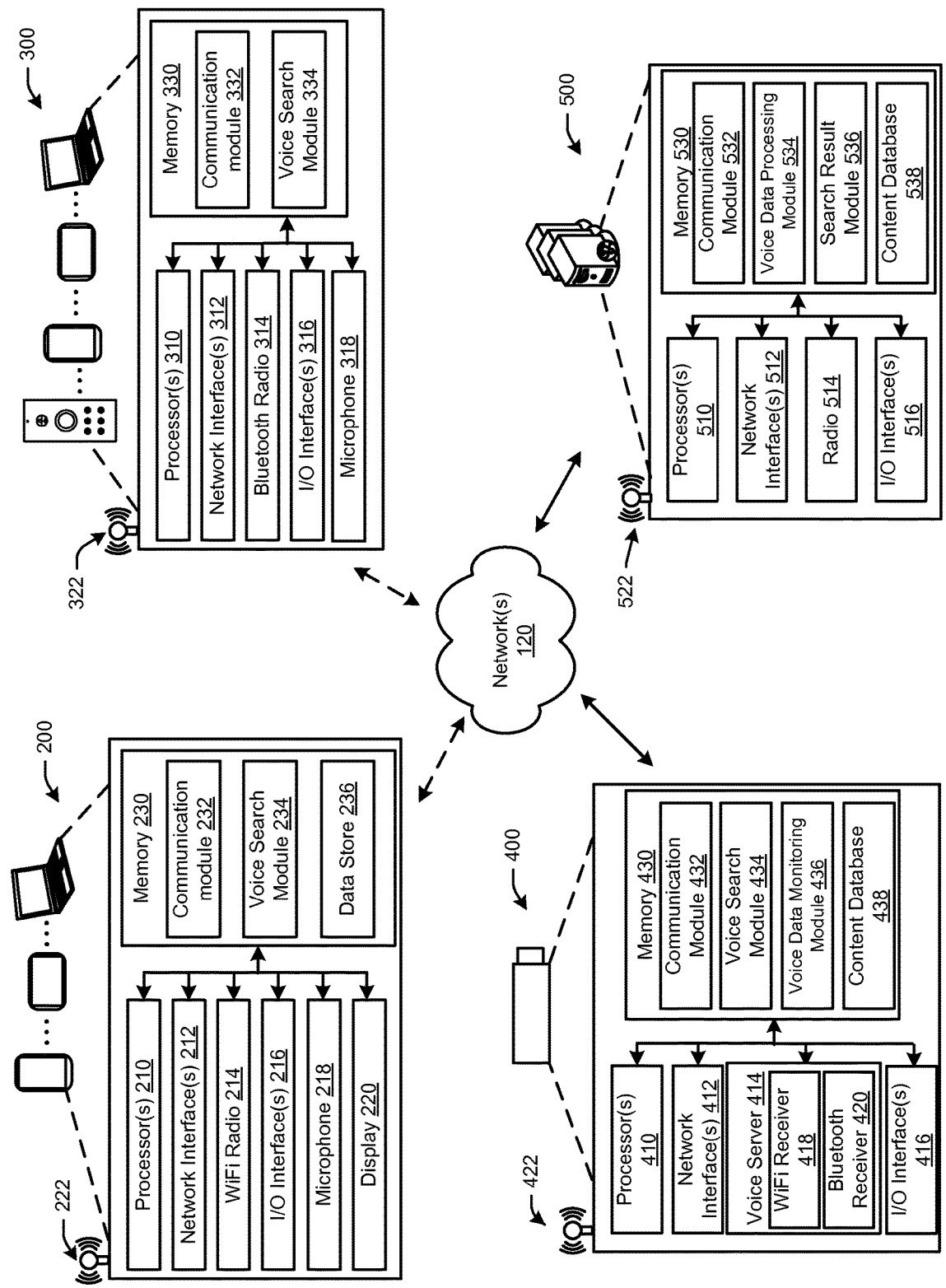
FIG. 5 is a schematic diagram of an illustrative system architecture for performing voice-based content searching including a mobile device configured to receive sound input, a media output device configured to receive voice data based on the sound input, and one or more servers configured to determine content selection options based on the voice data, in accordance with one or more example embodiments of the disclosure.

FIG. 5 is a schematic depiction of example components of the first mobile device 200, the second mobile device 300, the media output device 400, and the remote server(s) 500 depicted in FIGS. 1-4. The first mobile device 200 and the second mobile device 300 may be any suitable user device including, but not limited to, a mobile device such as a smartphone, a tablet, an e-reader, a remote control, or the like; a desktop computer; a laptop computer, a game console, a personal media player, and so forth. The first and second mobile devices 200, 300 may present user interfaces and/or may receive input from users, such as voice commands or other sound input. The first and second mobile devices 200, 300 may optionally be wirelessly connected to network(s) 120, as indicated by dashed lines. The media output device 400 may be connected to the remote server(s) 500 via network(s) 120.

In an illustrative configuration, the first mobile device 200 may include one or more processor(s) 210, one or more network interface(s) 212, a WiFi radio 214, one or more input/output ("I/O") interface(s) 216, a microphone 218, and a display 220 (which may be the display 204 illustrated in FIGS. 1-4). The display 220 may comprise any sort of display for visually rendering information, such as a liquid crystal display (LCD), a light-emitting diode (LED) display, an electronic paper display, an organic electroluminescent display (OLED), or the like. The display 220 may be a touch-sensitive display capable of receiving touch input and/or providing haptic feedback. The first mobile device 200 may include an antenna 222 configured to interact with the WiFi radio 214. Each component 210, 212, 214, 216, 218, 220 may be communicatively coupled to one or more memory devices 230 (hereinafter referred to as "memory 230"). The memory 230 may include modules stored thereon, such as a communication module 232, a voice search module 234, and a data store 236. Functionality of modules stored on memory 230 is described below. Although illustrated as including a WiFi radio 214, any other radio, such as a Bluetooth radio, configured to facilitate wireless communication may be included in the first mobile device 200. Although each of these components is shown in the illustrated embodiment, other embodiments may include additional or fewer components.

The second mobile device 300 may include one or more processor(s) 310, one or more network interface(s) 312, a Bluetooth radio 314, one or more input/output ("I/O") interface(s) 316, and a microphone 318 (which may be the microphone 308 of FIGS. 1-4). In some embodiments, the second mobile device 300 may include a display similar to the first mobile device 200. The second mobile device 300 may include an antenna 322 configured to interact with the Bluetooth radio 314. Each component 310, 312, 314, 316, 318 may be communicatively coupled to one or more memory devices 330 (hereinafter referred to as "memory 330"). The memory 330 may include modules stored thereon, such as a communication module 332 and a voice search module 334. Functionality of modules stored on memory 330 is described below. Although illustrated as including a Bluetooth radio 314, any other radio, such as a WiFi radio, configured to facilitate wireless communication may be included in the second mobile device 300. Although each of these components is shown in the illustrated embodiment, other embodiments may include additional or fewer components.

The media output device 400 may include one or more processor(s) 410, one or more network interface(s) 412, one or more input/output ("I/O") interface(s) 416, and a voice server 414 that may include a WiFi receiver 418 and a Bluetooth receiver 420. The media output device 400 may include an antenna 422 configured to interact with the voice server 414. Each component 410, 412, 414, 416 may be communicatively coupled to one or more memory devices 430 (hereinafter referred to as "memory 430"). The memory 430 may include modules stored thereon, such as a communication module 432, a voice search module 434, a voice data monitoring module 436, and, in the illustrated embodiment, a content database 438. Functionality of modules stored on memory 430 is described below. Although the voice server 414 is illustrated as including a WiFi receiver 418 and a Bluetooth receiver 420, other receivers configured to receive data over different wireless communication protocols may be included at the media output device 400. Although each of these components is shown in the illustrated embodiment, other embodiments may include additional or fewer components.

The remote server(s) 500 may include one or more processor(s) 510, one or more network interface(s) 512, a radio 514, and one or more input/output ("I/O") interface(s) 516. Each component 510, 512, 514, 516 may be communicatively coupled to one or more memory devices 530 (hereinafter referred to as "memory 530"). The remote server(s) 500 may include an antenna 522 configured to interact with the radio 514. The memory 530 may include modules stored thereon, such as a communication module 532, a voice data processing module 534, and a search result module 536. The memory 530 may also include or otherwise have access to a content database 538. Functionality of modules stored on memory 530 is described below. Although each of these components is shown in the illustrated embodiment, other embodiments may include additional or fewer components.

The first and/or second mobile devices 200, 300, the media output device 400, and the remote server(s) 500 may include various additional components, such as one or more input/output device(s) configured to interact with the respective I/O interface(s) 216, 316, 416, 516 to allow users to provide input to and/or receive output from the respective mobile device 200, 300, media output device 400, or remote server(s) 500. The I/O interface(s) 216, 316, 416, 516 may be configured to receive voice input. The first and/or second mobile devices 200, 300, the media output device 400, and the remote server(s) 500 may also include an operating system configured to provide an interface between software and hardware resources of the respective device 200, 300, 400, 500 and/or database management systems configured to support functionality for storing and retrieving data in one or more datastores (which may include the memory 230, 330, 430, 530). The first and/or second mobile devices 200, 300, the media output device 400, and/or the remote server(s) 500 may further include system buses that functionally couple various components of the respective devices. In other embodiments, any of the illustrated devices 200, 300, 400, 500 may include additional or fewer components.

The respective processor(s) 210, 310 of the first and second mobile devices 200, 300, as well as the respective processor(s) 410, 510 of the media output device 400 and the remote server(s) 500 may be configured to access the respective memory devices 230, 330, 430, 530 and execute computer-executable instructions loaded therein. For example, the processor(s) 210, 310, 410, 510 may be configured to execute computer-executable instructions of the various program modules of the respective devices 200, 300, 400, 500 to cause or facilitate various operations to be performed in accordance with one or more embodiments of the disclosure. The processor(s) 210, 310, 410, 510 may include any suitable processing unit capable of accepting data as input, processing the input data in accordance with stored computer-executable instructions, and generating output data. The processor(s) 210, 310, 410, 510 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 210, 310, 410, 510 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 210, 310, 410, 510 may be capable of supporting any of a variety of instruction sets.

The network interface(s) 212, 312 of the respective first and second mobile devices 200, 300, and the network interface(s) 412, 512 of the respective media steaming device 400 and remote server(s) 500 may be configured to allow each device 200, 300, 400, 500 to communicate with content providers and other entities over networks (e.g., one or more of the network(s) 120, WiFi connection 130, Bluetooth connection 140), such as local-area networks (LANs), wide-area networks (WANs), the Internet, wireless networks, wireless wide-area networks (WWANs), cable television networks, telephone networks, cellular communications networks, combinations of the foregoing, and/or the like. Further, such network(s) 120 may have any suitable communication range associated therewith and may include, for example, metropolitan area networks (MANs) or personal area networks (PANs). In addition, such network(s) 120 may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

The I/O interface(s) 216, 316, 416, 516 of the respective devices 200, 300, 400, 500 may facilitate the receipt of input information at the respective device 200, 300, 400, 500 from one or more I/O devices, as well as the output of information from the respective device 200, 300, 400, 500 to the one or more I/O devices. The I/O devices may include, for example, one or more user interface devices that facilitate interaction between a user and the first or second mobile devices 200, 300 including, but not limited to, a display, a keypad, a pointing device, a control panel, a touch screen display, a remote control device, a microphone, a speaker, and so forth. The I/O devices may further include, for example, any number of peripheral devices such as data storage devices, printing devices, and so forth.

Each of the first mobile device 200, the second mobile device 300, the media output device 400, and the remote server(s) 500 may include one or more respective antennas 222, 322, 422, 522 capable of receiving and transmitting signals in accordance with any suitable communications protocol(s). Non-limiting examples of suitable antennas may include directional antennas, non-directional antennas, dipole antennas, folded dipole antennas, patch antennas, multiple-input multiple-output (MIMO) antennas, or the like. The respective antenna(s) 222, 322, 422, 522 may be communicatively coupled to one or more transceivers or radio components to which or from which signals may be transmitted or received. For example, the antenna 222 of the first mobile device 200 may be communicatively coupled to the WiFi radio 214 and configured to facilitate WiFi communication between the first mobile device 200 and the media output device 400.

Similarly, the antenna 322 of the second mobile device 300 may be communicatively coupled to the Bluetooth radio 314 and configured to facilitate Bluetooth communication between the second mobile device 300 and the media output device 400. The antenna 422 of the media output device 400 may be communicatively coupled to the voice server 414 and configured to facilitate wireless communication at the WiFi receiver 418 and the Bluetooth receiver 420, for example. The antenna 522 of the remote server(s) 500 may be communicatively coupled to the radio 514 and configured to facilitate wireless communication via network(s) 120, for example.

The respective antennas 222, 322, 422, 522 of each device 200, 300, 400, 500 may include, without limitation, a cellular antenna for transmitting or receiving signals to/from a cellular network infrastructure, such as a Global System for Mobile Communications (GSM), 3G standards (e.g., Universal Mobile Telecommunications System (UMTS), Wideband Code Division Multiple Access (W-CDMA), CDMA2000, etc.), 4G standards (e.g., Long-Term Evolution (LTE), WiMax, etc.), 5G standards, direct satellite communications, or the like. Other example antennas include a Global Navigation Satellite System (GNSS) antenna for receiving GNSS signals from a GNSS satellite, a Bluetooth antenna for transmitting or receiving Bluetooth signals, a Near Field Communication (NFC) antenna for transmitting or receiving NFC signals, and so forth.

One or more of the respective antennas 222, 322, 422, 522 may additionally, or alternatively, include a Wi-Fi antenna configured to transmit or receive signals in accordance with established standards and protocols, such as the IEEE 802.11 family of standards, including via 2.4 GHz channels (e.g. 802.11b, 802.11g, 802.11n), 5 GHz channels (e.g. 802.11n, 802.11ac), or 60 GHZ channels (e.g. 802.11ad). In alternative example embodiments, one or more of the respective antennas 222, 322, 422, 522 may be configured to transmit or receive radio frequency signals within any suitable frequency range forming part of the unlicensed portion of the radio spectrum. In certain example embodiments, the first mobile device 200 may bypass the media output device 400 and communicate with the remote server(s) 500 via an Internet connection or via network(s) 120. In other example embodiments, the first mobile device 200 may communicate with the remote server(s) 500 via the media output device 400. That is, the first mobile device 200 may communicate with the media output device 400 using a local area network (LAN) connection (e.g., WiFi Direct), and the media output device 400 may communicate with the remote server(s) 500 via a wired (e.g., Ethernet) or wireless (e.g., WiFi) connection to the Internet. The first mobile device 200 and/or the second mobile device 300 may include components/circuitry for communicating with one or more other devices (e.g., the media output device 400) using BLUETOOTH™, WiFi, infrared (IR), or audible protocols.

The WiFi radio 214 of the first mobile device 200, in cooperation with the antenna 222, may be configured to transmit or receive radio frequency (RF) signals in the bandwidth and/or channels corresponding to the communications protocols utilized by the first mobile device 200 to communicate with other devices. The transceiver or radio 214 may include hardware, software, and/or firmware for modulating, transmitting, or receiving, potentially in cooperation with any of antenna(s) 222, communications signals according to any of the communications protocols discussed above including, but not limited to, one or more Wi-Fi and/or Wi-Fi direct protocols, as standardized by the IEEE 802.11 standards, one or more non-Wi-Fi protocols, or one or more cellular communications protocols or standards. The radio 214 may include any known receiver and baseband suitable for communicating via the communications protocols utilized by the first mobile device 200.

The Bluetooth radio 314 of the second mobile device 300, in cooperation with the antenna 322, may be configured to transmit or receive radio frequency (RF) signals in the bandwidth and/or channels corresponding to the communications protocols utilized by the second mobile device 300 to communicate with other devices. The transceiver or radio 314 may include hardware, software, and/or firmware for modulating, transmitting, or receiving, potentially in cooperation with any of antenna(s) 322, communications signals according to any of the communications protocols discussed above including, but not limited to, one or more Bluetooth and/or Bluetooth LE™ wireless communication protocols, Wi-Fi and/or Wi-Fi direct protocols, as standardized by the IEEE 802.11 standards, one or more non-Wi-Fi protocols, or one or more cellular communications protocols or standards. The radio 314 may include any known receiver and baseband suitable for communicating via the communications protocols utilized by the second mobile device 300.

The memory devices 230, 330, 430, 530 of the respective devices 200, 300, 400, 500 may include one or more program modules, applications, or the like. Any of the modules may include one or more sub-modules. For example, the voice data monitoring module 436 of the media output device 400 may include one or more voice recognition modules and sound input detection modules. Any of the modules depicted in FIG. 5 may include computer-executable code, instructions, or the like that may be loaded into the respective memory devices 230, 330, 430, 530 for execution by one or more of the respective processor(s) 210, 310, 410, 510. Further, any data may be loaded into the respective memory devices 230, 330, 430, 530 for use by the respective processor(s) 210, 310, 410, 510 in executing computer-executable code.

Any one of the memory devices 230, 330, 430, 530 of the respective devices 200, 300, 400, 500 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. In certain example embodiments, volatile memory may enable faster read/write access than non-volatile memory. However, in certain other example embodiments, certain types of non-volatile memory (e.g., FRAM) may enable faster read/write access than certain types of volatile memory. The memory 130 may include removable and/or non-removable media which may be implemented in any method or technology for storage of information, such as computer-readable instructions, data structures, program modules, or other data.

In various implementations, any one of the memory devices 230, 330, 430, 530 of the respective devices 200, 300, 400, 500 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. Any one of the memory devices 230, 330, 430, 530 of the respective devices 200, 300, 400, 500 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.). Other examples of memory include EEPROM, flash memory, CD-ROM, digital versatile disks (DVD) or other optical storage, magnetic cassettes, magnetic tape, magnetic disk storage, or other magnetic storage devices, RAID storage systems, or any other medium which can be used to store the desired information and which can be accessed by a computing device.

The data store 236 of the first mobile device 200 may provide non-volatile storage of computer-executable instructions and other data. The memory 230 and the data store 236, removable and/or non-removable, are examples of computer-readable storage media (CRSM) as that term is used herein. The data store 236 may store computer-executable code, instructions, or the like that may be loadable into the memory 230 and executable by the processor(s) 210 of the first mobile device 200 to cause the processor(s) 210 to perform or initiate various operations. The data store 236 may additionally store data that may be copied to memory 230 for use by the processor(s) 210 during the execution of the computer-executable instructions. Moreover, output data generated as a result of execution of the computer-executable instructions by the processor(s) 210 may be stored initially in memory 230, and may ultimately be copied to data store 236 for non-volatile storage.

The first and second mobile devices 200, 300 may include respective microphones 218, 318. The microphones 218, 318 may be configured to generate signals based at least in part on incident or ambient sounds. The signals generated by the microphones 218, 318 may be analog signals. The microphones 218, 318 may be configured to receive sound input in the form of analog sound input and may generate electrical signals indicative of the analog sound which may be converted to digital data using an ADC.

The voice server 414 of the media output device 400 may include the WiFi receiver 418 and the Bluetooth receiver 420. The WiFi receiver 418 may be configured to listen or monitor for voice data or other data being wirelessly transmitted to the media output device 400 by another device over a WiFi wireless communication protocol. The Bluetooth receiver 420 may be configured to listen or monitor for voice data or other data being wirelessly transmitted to the media output device 400 by another device over a Bluetooth wireless communication protocol.

Referring now to functionality supported by the various program modules depicted in FIG. 5, the respective communication modules 232, 332, 432, 532 of each device 200, 300, 400, 500 may include computer-executable instructions, code, or the like, that, responsive to execution by the respective processor(s) 210, 310, 410, 510, may cause data to be transmitted to and/or received from other devices. In one example, the communication module 232 of the first mobile device 200 may cause data to be transmitted to the media output device 400 via a WiFi or WiFi Direct connection. In another example, the communication module 332 of the second mobile device 300 may cause data to be transmitted to the media output device 400 via a Bluetooth connection.

The voice search modules 234, 334 of the respective first and second mobile device 200, 300 may include computer-executable instructions, code, or the like, that, responsive to execution by the respective processor(s) 210, 310 may cause a voice search initiation signal to be transmitted to another device, indicating that voice data may be transmitted thereafter. The voice search modules 234, 334 may further cause the respective microphones 218, 318 to become activated and may further cause analog sound signals captured by the respective microphones 218, 318 to be converted to voice data. The voice search modules 234, 334 may further cause the voice data to be directed to the respective communication modules 232, 332 for transmission to other devices. In some embodiments, voice data may include metadata, such as device identification information, software identification information, at the like. The voice search module 234 of the first mobile device 300 may further cause user interfaces to be rendered on the display 220 of the first mobile device 200. The voice search modules 234, 334 may also be configured to provide feedback, such as haptic or visual feedback, to users. It should be appreciated that feedback may be output in various other forms (e.g., visual output, audible output, haptic output, etc.). Although the second mobile device 300 is illustrated without a display, the second mobile device 300 may provide haptic feedback, for example upon pressing and release of the voice search button 306 shown in FIG. 1.

The voice search module 434 of the media output device 400 may include computer-executable instructions, code, or the like, that, responsive to execution by the one or more processor(s) 410 may initiate voice-based content searching upon receiving a voice search initiation signal. Upon receiving a voice search initiation signal, the voice search module 434 may cause the media output device 400 to monitor the voice server 414, or more specifically, the WiFi receiver 418 and the Bluetooth receiver 420. Monitoring the voice server 414 may include listening to one or both the receivers for voice data, determining that voice data is being received at one or both of the receivers, and/or discarding a portion of or an entirety of voice data. Discarding voice data may include, in certain embodiments, listening or monitoring for voice data, or receiving voice data, at a specific receiver, but closing, or not opening, a port or a local socket associated with the specific receiver at which the voice data is to be discarded. For example, in an instance where voice data received at the Bluetooth receiver 420 is to be discarded, voice data may be received at the Bluetooth receiver 420, but the local socket at the Bluetooth receiver 420 and the voice server 414 may not be opened. The voice data received at the Bluetooth receiver 420 is therefore discarded and not processed in such embodiments. In some embodiments, discarding voice data may include denying a connection request from the Bluetooth receiver or WiFi receiver, or other wireless protocol receiver, to communicate the second voice data. For example, the Bluetooth receiver 418 may request that a connection be opened between the Bluetooth receiver 418 and the voice server 414, and the connection may be denied or otherwise not accepted, such that no socket is opened between the voice server 414 and the Bluetooth receiver 418 when the Bluetooth receiver is receiving voice data while the WiFi receiver is receiving voice data, or vice versa.

The voice data monitoring module 436 of the media output device 400 may include computer-executable instructions, code, or the like, that, responsive to execution by the one or more processor(s) 410 may determine that voice data is being received at one or both of the WiFi receiver 418 or the Bluetooth receiver 420. The voice data monitoring module 436 may determine which receiver 418, 420 began receiving voice data first in time in some embodiments. The voice data monitoring module 436 may receive voice data until a voice transmission completion signal is received by the media output device 400, at which time the voice data monitoring module 436 may cease receiving voice data over the receivers 418, 420. The voice data monitoring module 436 may further identify or determine the receiver at which voice data is being actively received, as well as identify a device from which voice data is being received. For example, the voice data monitoring module 436 may be configured to receive a mobile device identifier for mobile devices transmitting voice data to the media output device 400.

In the illustrated embodiment, the media output device 400 includes a content database 438 which may include portions of content locally stored on memory 430. Such content may be some or all of content that may be desired by users. For example, portions of content, such as the first 30 seconds of a movie, may be stored locally at the media output device 400 for each search result identified by the remote server(s) 500. The local content database 438 may serve as a buffer to provide smooth playback at the content providing device 550.

The voice data processing module 534 of the remote server(s) 500 may include computer-executable instructions, code, or the like, that, responsive to execution by the one or more processor(s) 510 may receive voice data from the media output device 400 and may process the voice data to determine or otherwise identify a set of candidate search options. The candidate search options may be text string queries, graphics, or other forms of search queries. The set of candidate search options may include one or more search options based at least in part on the voice data. The voice data processing module 534 may utilize speech-to-text algorithms to determine candidate search options.

The search result module 536 of the remote server(s) 500 may include computer-executable instructions, code, or the like, that, responsive to execution by the one or more processor(s) 510 may receive a selected search option from the set of candidate search options and may execute a search for content. In some embodiments, the selected search option may be received from the media output device 400, while in other embodiments, the selected search result may be received from another device, such as the first or second mobile devices 200, 300. In one example, the search result module 536 may search at a local or remote database to identify content selection options and/or search results and cause the identified search results to be transmitted to the media output device 400. In some embodiments, where a single content selection option is found by the search result module 536, the search result module 536 may initiate immediate playback of the identified content selection.

The search results and/or content selection options identified by the search result module 536 may include one or more content items (e.g., movies) identified as having a threshold level of relevance to the processed voice data (e.g., a speech-to-text translation of the data). The search result module 536 may cause the remote server(s) 500 to transmit the search results, or in some instances, content selection options, to the media output device 400 in the form of metadata associated with the content selection options.

While FIG. 5 illustrates one example media output device, one example remote server(s), and two example mobile devices, it is to be appreciated that multiple other devices and architectures may implement the described techniques. For instance, the components or modules illustrated as being located on or accessible to the first or second mobile devices 200, 300 may be located in any other location, such as on one or more of servers that are accessible to the device over a network, distributed among servers, located on other user devices, and/or the like.

It should further be appreciated that the first mobile device 200, the second mobile device 300, the media output device 400, and/or the remote server(s) 500 may include alternate and/or additional hardware, software, or firmware components beyond those described or depicted without departing from the scope of the disclosure. More particularly, it should be appreciated that software, firmware, or hardware components depicted as forming part of the first and second mobile devices 200, 300, the media output device 400, and the remote server(s) 500 are merely illustrative and that some components may not be present or additional components may be provided in various embodiments. It should further be appreciated that each of the above-mentioned modules may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other modules. Further, one or more depicted modules may not be present in certain embodiments, while in other embodiments, additional modules not depicted may be present and may support at least a portion of the described functionality and/or additional functionality. Moreover, while certain modules may be depicted and described as sub-modules of another module, in certain embodiments, such modules may be provided as independent modules or as sub-modules of other modules.

Illustrative Processes

Figure 6:
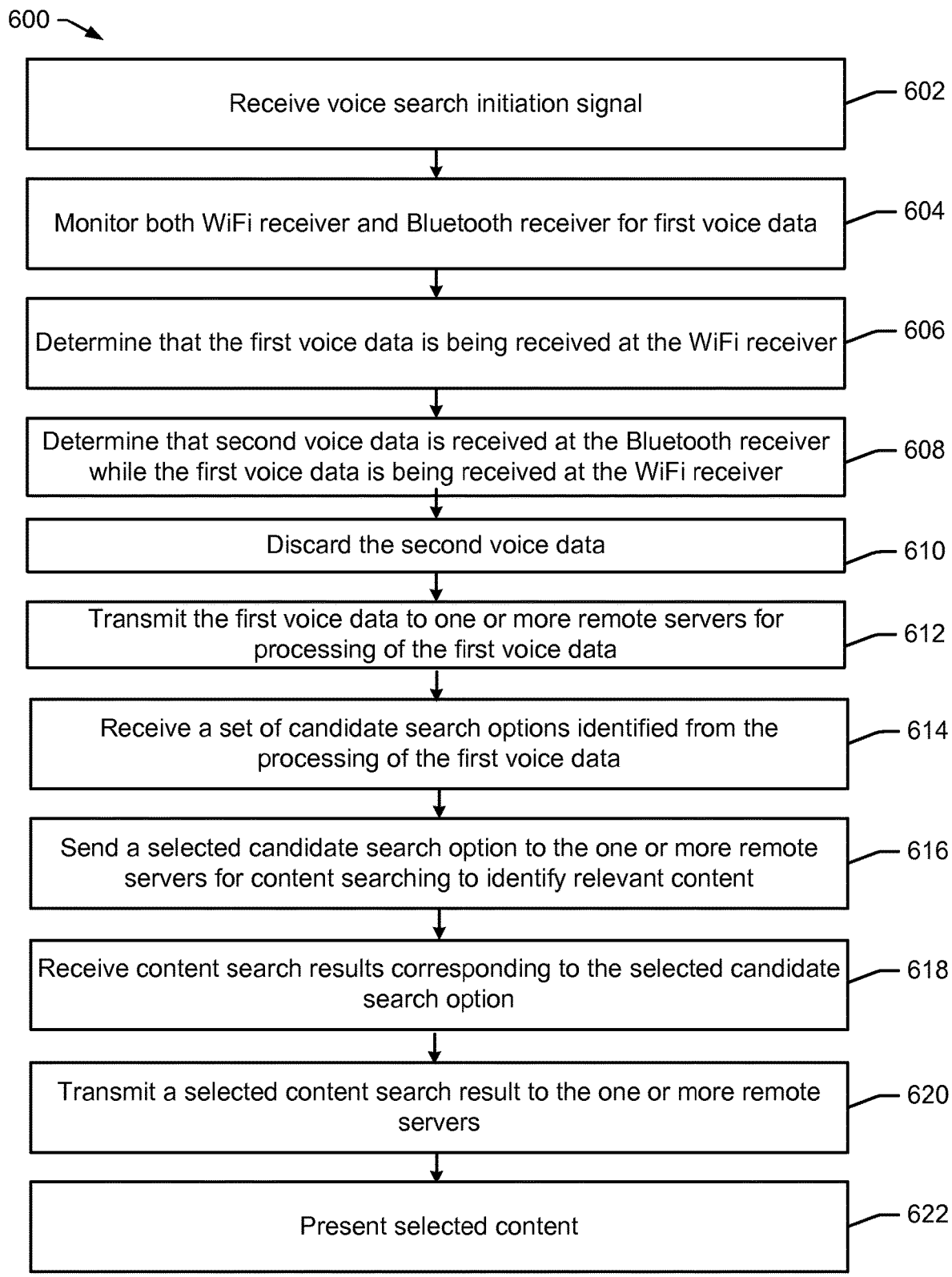
FIG. 6 is a process flow diagram of an illustrative method for performing voice-based content searching in accordance with one or more example embodiments of the disclosure.

FIG. 6 depicts an illustrative method 600 for receiving voice data in accordance with one or more embodiments of the disclosure and will be discussed in conjunction with an example data flow 700 over time (as denoted on the vertical axis) illustrated in FIG. 7. In example embodiments, the method 600 may be performed to receive sound or voice data and provide content search results based at least in part on the sound or voice data. While the operations of method 600 and data flow 700 may be described in the illustrative context of consumable content, such as movies, it should be appreciated that the method 600 is more broadly applicable to other types of content. The method 600 may be performed, in one example, by the media output device 400 of FIG. 5, components of which are referenced in this section.

Figure 7:
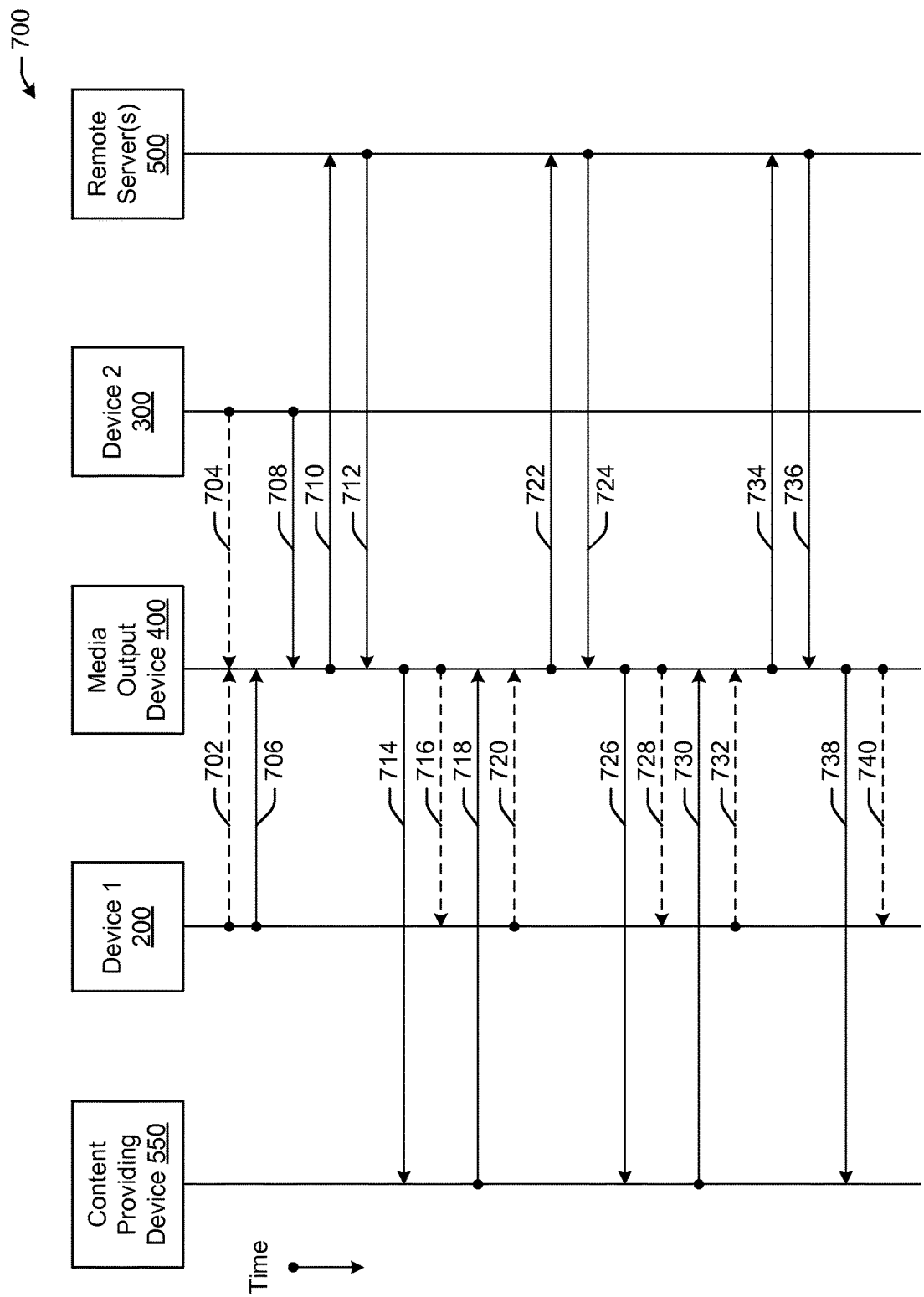
FIG. 7 is an example data flow corresponding to the method of FIG. 6 in accordance with one or more example embodiments of the disclosure.

Referring first to the example illustrated in FIG. 7, at communication 702 the first mobile device 200 may transmit a voice search initiation signal to the media output device 400 over a WiFi communication protocol. For example, the first mobile device 200 may be a smartphone, and the voice search initiation signal may be transmitted by a user performing a drag-and-hold gesture at a user interface of a mobile application executed on the smartphone, as described herein. At the same time, or at substantially the same time, as communication 702, the second mobile device 300 may transmit a voice search initiation signal to the media output device 400 over a Bluetooth communication protocol at communication 704. For example, the second mobile device 300 may be a remote control with a voice search button 306 as shown in FIG. 1, and a user may press or press and hold the voice search button to transmit the voice search initiation signal to the media output device 400. In some embodiments, only one or the other of the first and second mobile devices 200, 300 may transmit the voice search initiation signal to the media output device 400, as indicated by the dashed lines in data flow 700.

At block 602 of the method 600, the media output device 400 may receive a voice search initiation signal. The media output device 400 may receive the voice search initiation signal at either the WiFi receiver 418 or the Bluetooth receiver 420 of the voice server 414, depending on which of communications 702 and 704 took place. In an embodiment where communication 702 occurred, for example, the media output device 400 receives the voice search initiation signal at the WiFi receiver 418, whereas if communication 704 occurred, the media output device 400 receives the voice search initiation signal at the Bluetooth receiver 420. In instances where voice search initiation signals are simultaneously received, such as when both communications 702 and 704 occur at the same time, the media output device 400 may receive one voice search initiation signal at the WiFi receiver 418, and another voice search initiation signal at the Bluetooth receiver 420. The voice signal may be received at a time corresponding to a gesture input at a user interface of the first mobile device 200, as discussed herein.

Upon receiving a voice search initiation signal, at block 604 of method 600, computer-executable instructions of the voice search module 434 may be executed to cause the media output device 400 to monitor both the WiFi receiver 418 and the Bluetooth receiver 420 for first voice data. Monitoring for voice data may include listening, by the media output device 400, for voice data at both the WiFi receiver and the Bluetooth receiver. In some embodiments, the media output device 400 may monitor for voice data by activating one or both of the WiFi and/or Bluetooth receivers. In some embodiments, the media output device 400 may designate the connection at which the voice search initiation signal was received as an active connection. For example, if the media output device 400 received a voice search initiation signal at a WiFi receiver, the media output device 400 may designate the WiFi receiver and/or the WiFi connection as an active connection, and may monitor the WiFi receiver for voice data. In such instances, the media output device 400 may discard voice data received over other connections, such as at the Bluetooth receiver, while the WiFi receiver is designated as active.

Referring again to FIG. 7, at communication 706 the first mobile device 200 may begin transmitting first voice data to the media output device 400. At block 606 of method 600, computer-executable instructions of the voice data monitoring module 436 of the media output device 400 may be executed to determine that the first voice data is being received at the WiFi receiver 418. In some embodiments, the media output device 400 may determine a first wireless communication protocol over which the first voice data is received. In this example, for instance, the media output device 400 may determine that the first voice data is being received over a WiFi communication protocol.

At communication 708 of data flow 700, the second mobile device 300 may transmit second voice data to the media output device over a Bluetooth communication protocol while the first mobile device 200 is transmitting the first voice data to the media output device 400 over a WiFi communication protocol. At block 608 of method 600, computer-executable instructions of the voice data monitoring module 436 of the media output device 400 may be executed to determine that second voice data is being received at the Bluetooth receiver 420 while the first mobile device 200 is transmitting the first voice data at the WiFi receiver 418. In some embodiments, the media output device 400 may determine that receipt of the first voice data was initiated before receipt of the second voice data.

At block 610 of method 600, computer-executable instructions of the voice data monitoring module 436 may be executed to discard the second voice data received at the Bluetooth receiver 420 while the first voice data is received at the WiFi receiver 418. Discarding the second voice data may include not processing the second voice data, placing the second voice data in a buffer, marking the second voice data for deletion, closing a local socket associated with the receiver at which the voice data is to be discarded, and the like.

In some embodiments, upon completion of transmitting the first voice data, the first mobile device 200 may transmit a voice transmission completion signal to the media output device 400, or may cease transmission of data after transmission of the first voice data is complete. Upon receiving the first voice data, the media output device 400 may store the first voice data in some embodiments, along with additional information, such as a device identifier or software identifier of the first mobile device 200.

At block 612 of method 600, computer-executable instructions of the communication module 432 of the media output device 400 may be executed to transmit the first voice data to one or more remote servers for processing of the first voice data, which may include voice analysis. In some embodiments, transmission of the first voice data by the media output device 400 may begin when initial voice data is received by the media output device 400, before an entirety of the voice data is received. In such embodiments, processing time at the one or more remotes servers may be reduced. For example, voice data may be received at the media output device 400 in 30 millisecond data and may be related to the one or more remote servers upon receipt or concurrently as subsequent voice data is received. In such embodiments, processing may begin before or after all voice data is received at the one or more remote servers. Communication 810 illustrates the media output device 400 transmitting the first voice data to remote server(s) 500. The remote server(s) 500 may receive the first voice data and may process the first voice data to generate a set of one or more candidate search options. The candidate search options may provide search terms in the form of text, graphics, and the like for use in a content search.

At block 614 of method 600, the media output device 400 may receive information associated with candidate search options based at least in part on the first voice data. For example, at communication 712 in data flow 700, the remote server(s) 500 may transmit information or an indication of a set of candidate search options to the media output device 400, and the media output device 400 may receive the candidate search options. At communication 714, computer-executable instructions of the communication module 432 of the media output device 400 may be executed to cause the content providing device 550 to present information associated with the candidate search options on a display of the viewing device. In some embodiments, the media output device 400 may optionally cause the first mobile device 200 to present information associated with the candidate search options at communication 716, instead of, or in addition to, presentation at the content providing device 550. A user may view the candidate search options and make a selection of one of the candidate search options for content searching. At communication 718, the content providing device 550 may transmit the user selection to the media output device 400. In some embodiments, the first mobile device 200 may transmit the user selection to the media output device 400 at communication 720. Although not shown, the second mobile device 300 may also transmit a user selection to the media output device 400. The media output device 400 may receive the user selection.

At block 616 of method 600, computer-executable instructions of the communication module 432 of the media output device 400 may be executed to transmit the selected one of the search options to one or more remote servers for content searching. For example, at communication 722, the media output device 400 may transmit the selected one of the candidate search options to the remote server(s) 500. The remote server(s) 500 may receive an indication of the selected candidate search option and may perform a content search to identify content search results identified as having a threshold level of relevance to the selected search option.

At block 618 of method 600, the media output device 400 may receive search results based at least in part on the selected one of the search options. For example, the remote server(s) 500 may transmit identified search results, and in some embodiments, content selection options, to the media output device 400 at communication 724. The media output device 400 may receive the search results and, at communication 726, may cause the search results, or information associated with the search results, to be presented at the viewing device 400. At communication 728, in some embodiments, the media output device 400 may cause the search results to be presented at the first mobile device 200 instead of, or in addition to, presentation at the content providing device 550. At communication 730, the media output device 400 may receive a selection of one of the search results or content selection options from the content providing device 550 indicating content a user desires to consume. In some embodiments, the first mobile device 200 may transmit a selection of one of the search results to the media output device 400 at communication 732 instead of communication 730 by the content providing device 550.

At block 620 of method 600, computer-executable instructions of the communication module 432 of the media output device 400 may be executed to transmit the selected search result to the one or more remote servers. For example, at communication 734, the media output device 400 may transmit the selected search result to the remote server(s) 500. The remote server(s) 500 may receive an indication of the selected search result and may search the content database 538, for example, to identify or otherwise locate the requested content. At communication 736, the remote server(s) 500 may transmit all, or a portion of, the requested content in a data stream to the media output device 400. The media output device 400 may receive the content from the remote server(s) 500.

At block 622 of method 600, computer-executable instructions of the communication module 432 of the media output device 400 may be executed to cause presentation of the selected content. For example, at communication 838, the media output device 400 may cause the selected content to be presented at the content providing device 550. In some embodiments, the media output device 400 may cause the selected content or related content to be presented at the first mobile device 200 instead of, or in addition to, presentation at the content providing device 550. Although data flow 700 illustrates communications occurring over time, it is understood that any or all of the illustrated communications may occur partially or entirely simultaneously.

It should be noted, that the method 600 may be modified in various ways in accordance with certain embodiments of the disclosure. For example, one or more operations of method 600 may be eliminated or executed out of order in other embodiments of the disclosure. Additionally, other operations may be added to method 600 in accordance with other embodiments of the disclosure.

Figure 8:
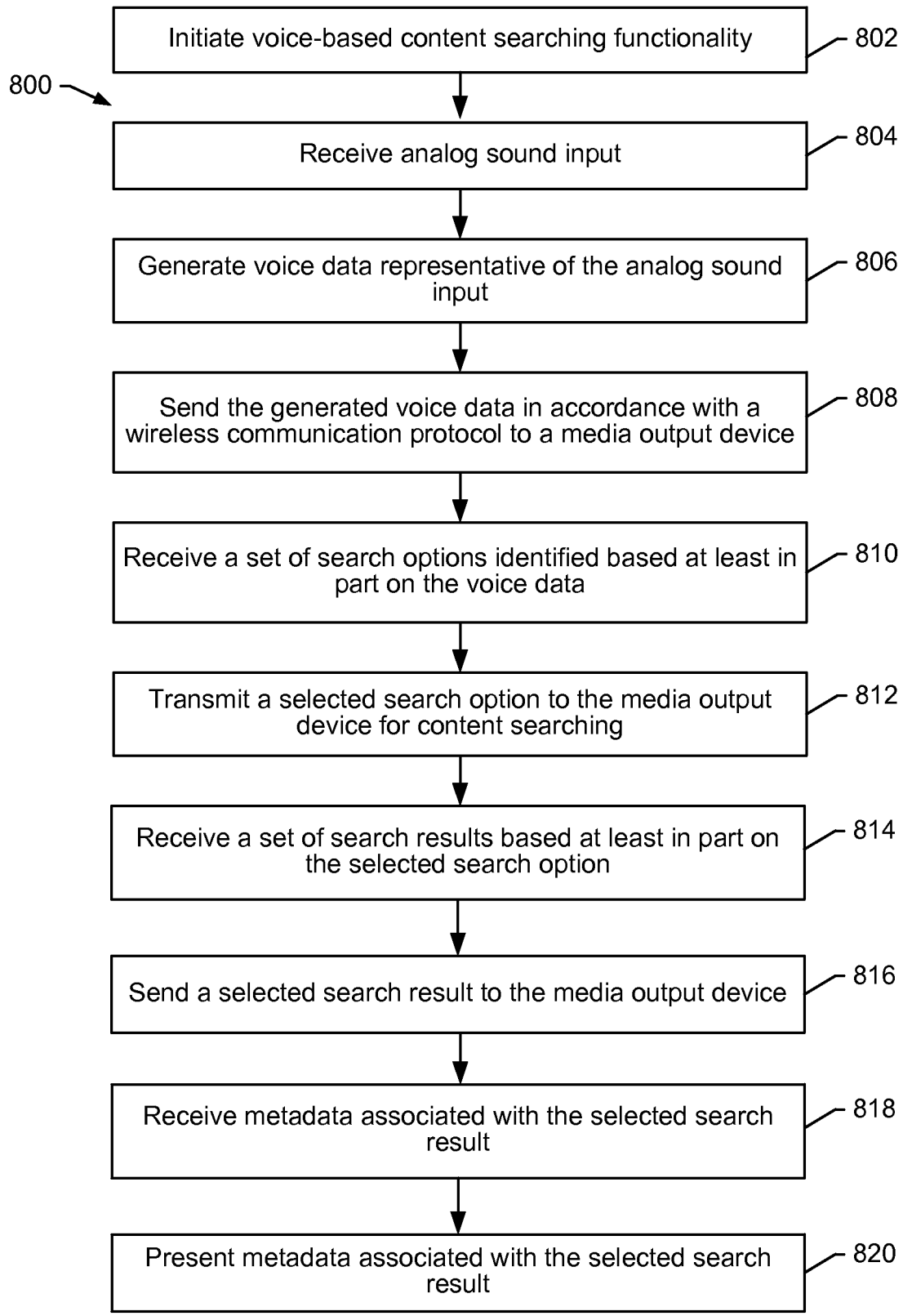
FIG. 8 is a process flow diagram of another illustrative method for performing voice-based content searching in accordance with one or more example embodiments of the disclosure.
Figure 9:
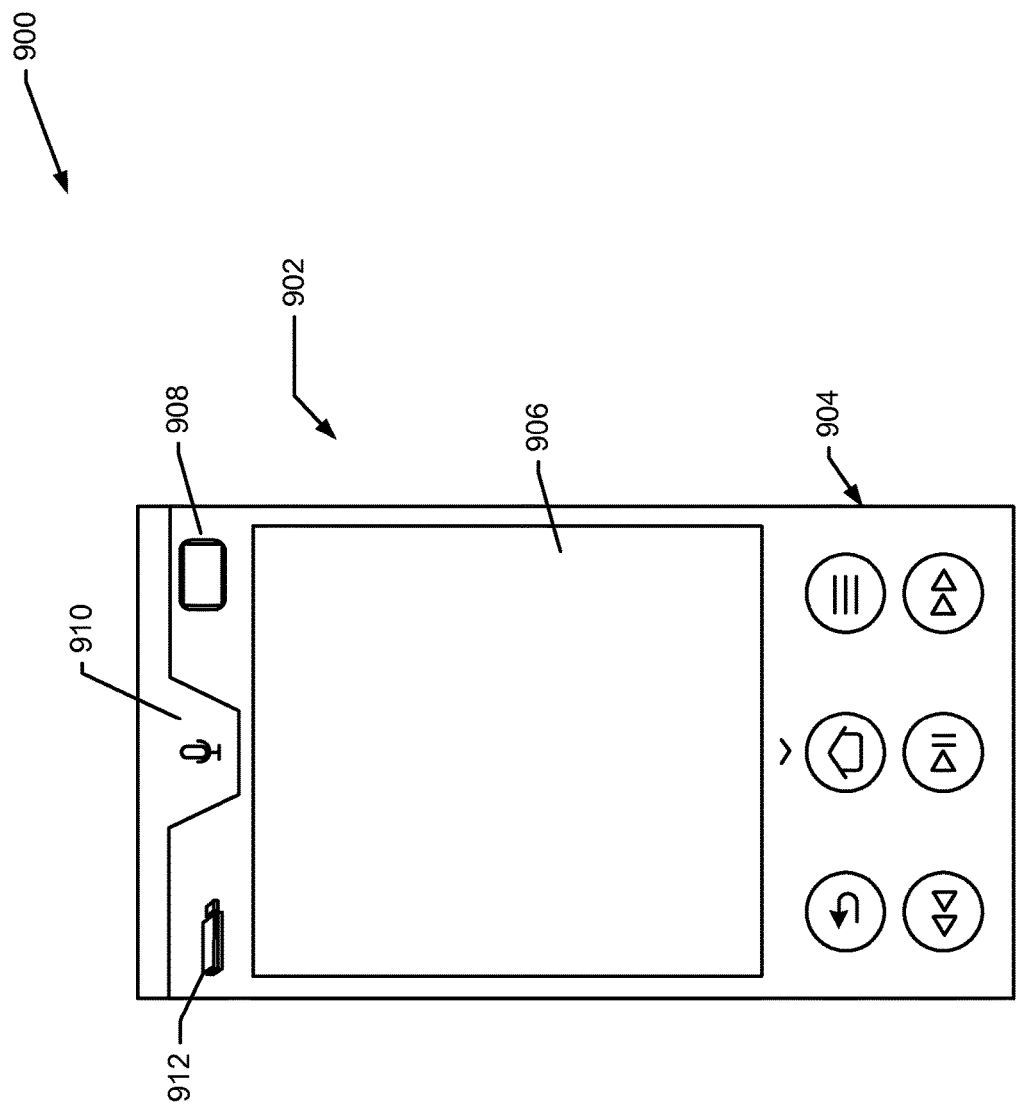
FIGS. 9-11 depict example user interfaces presented in connection with voice-based content searching in accordance with one or more example embodiments of the disclosure.
Figure 10:
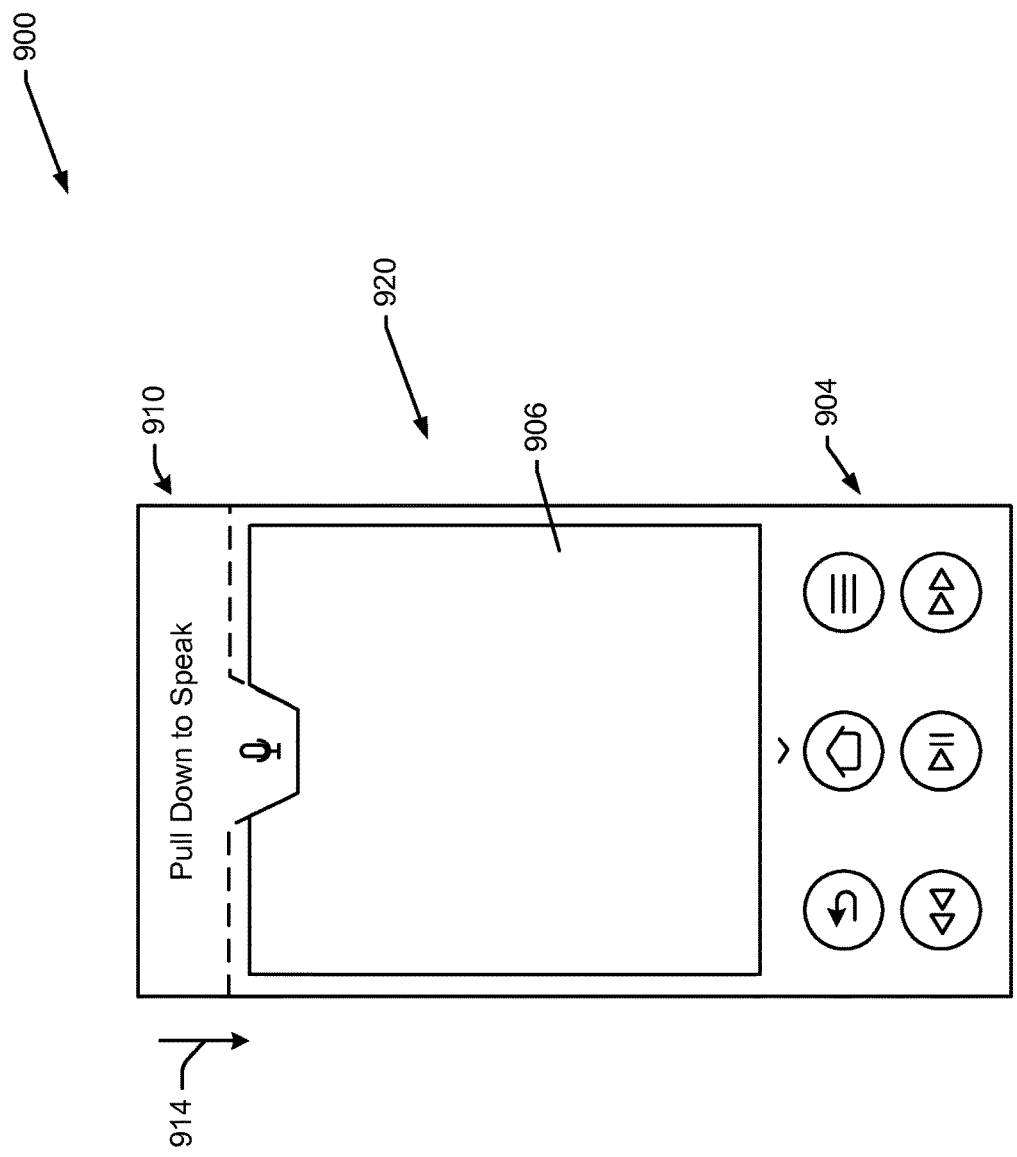
Figure 11:
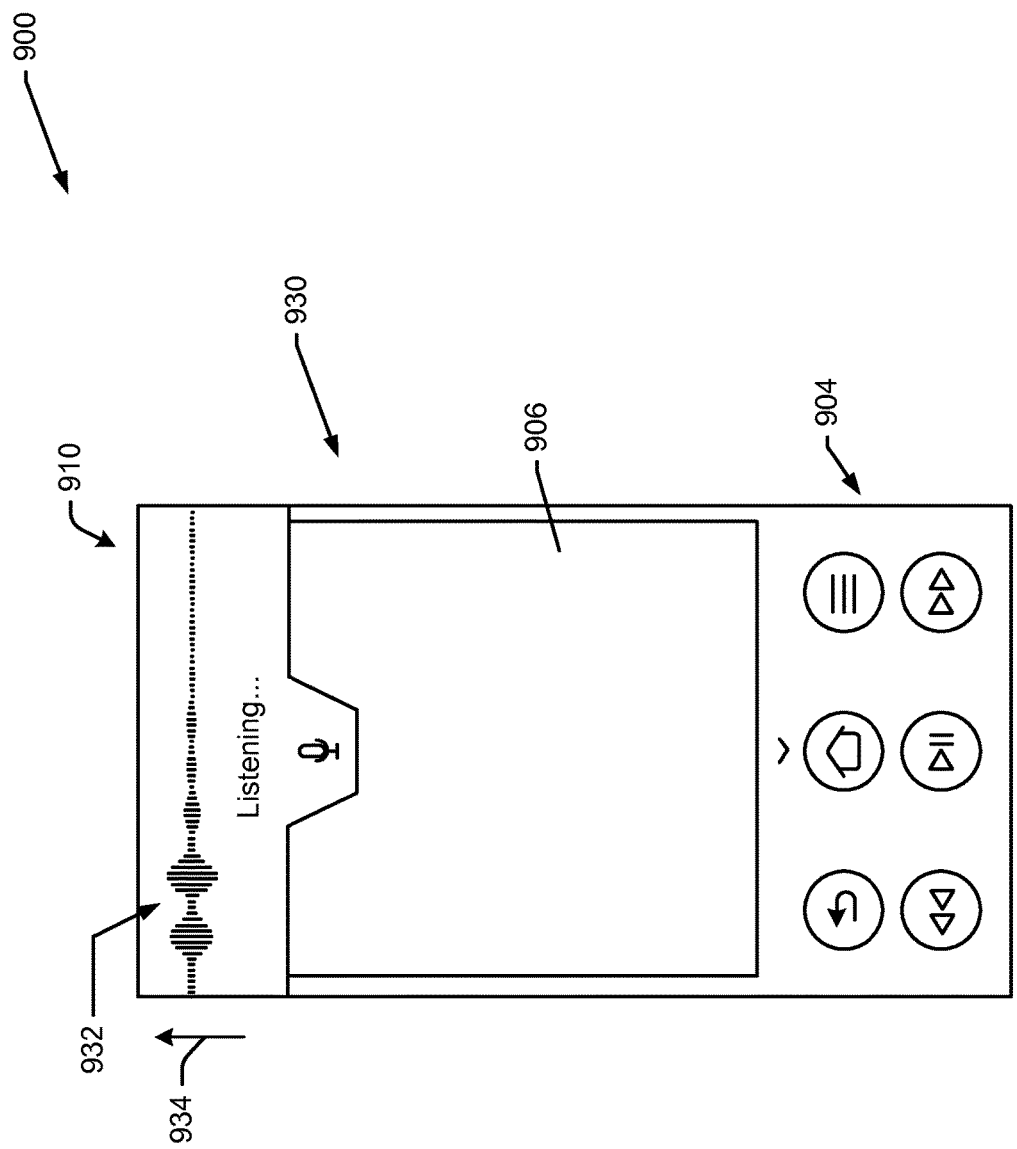

Referring now to FIGS. 8-10, FIG. 8 depicts an illustrative method 800 for voice-based content searching in accordance with one or more embodiments of the disclosure. FIGS. 9-11 illustrate example user interfaces that may be presented on displays of mobile devices, such as the display 220 of the first mobile device 200 of FIG. 5. In example embodiments, the method 800 may be performed to provide content search results based on voice or sound input. While the operations of method 800 may be described in the illustrative context of consumable content such as movies, it should be appreciated that the method 800 is more broadly applicable to other types of content. The method 800 may be performed, in one example, by the first mobile device 200 of FIG. 5, components of which are referenced in this section.

Referring to FIG. 9, a mobile device, such as the first mobile device 200 of FIG. 5, may present a user interface via a display of the mobile device, the user interface including a selectable element for initiating a voice search. The mobile device 900 may present a first user interface 902 with playback options 904, content information portion 906, search designation button 908, voice search button 910, and media output device connection button 912. The voice search button 910 may be the selectable element for initiating a voice search. A user wishing to initiate a voice-based content search may tap or tap-and-hold the voice search button 910. A portion of either the tap or the hold, or both, may be for a predetermined amount of time before the voice search button 910 can be dragged, such that a delay is created. In some embodiments, the mobile device may prepare to receive voice input during the delay, by, for example, activating a microphone. Such delay may reduce errors caused due to incomplete receipt of voice input. Haptic feedback may be provided to the user when, for example, the user performs a drag-and-hold gesture with the voice search button 910 for a predetermined amount of time.

At block 802 of the method 800, computer-executable instructions of the voice search module 234 may be executed to initiate voice-based content searching functionality. Referring to FIG. 10, a user may initiate voice-based content searching functionality by pressing and holding the voice search button 910, and dragging the voice search button 910 in direction 914. As the user drags the voice search button 910 in direction 914, the voice search button 910 may present text to the user such as "Pull Down to Speak,"

thereby informing the user of the status of the voice search functionality. The voice search button 910 may expand to cover a larger portion of the display portion of the mobile device. The mobile device may detect input corresponding to a particular gesture applied to the display of the mobile device, where the particular gesture indicates selection of the selectable element, or in this example, the voice search button 910. In some embodiments, upon an initial tap, a first user input, or a first touch input at the voice search button 910, the mobile device 900 may transmit a voice search initiation signal to the media output device. In other embodiments, upon dragging of the voice search button 910 over a predetermined threshold amount or number of input coordinates, the mobile device 900 may transmit a voice search initiation signal to the media output device. For example, a voice initiation signal may be sent after the voice search button 910 has been dragged about 5% of a total length or other dimension of the display, or touch interface of the display. In some embodiments, the mobile device 900 may transmit the voice search initiation signal upon presenting text such as "Pull Down to Speak." In certain embodiments, the voice search initiation signal may be sent a predetermined amount of time after the first touch input or the second touch input is detected at the mobile device. In some embodiments, when the voice search button 910 is expanded or otherwise displaced by a certain predetermined amount from an original position, the voice initiation signal may be sent to the media output device.

At block 804 of the method 800, computer-executable instructions of the voice search module 234 may be executed to receive analog sound input, for example from microphone 218. In FIG. 11, at a third user interface 930, as the user sufficiently drags and holds the voice search button 910 for a predetermined amount of time or for a predetermined threshold amount of input coordinates such that the voice search button has been dragged a threshold amount of the display, voice search functionality may be initiated and microphone 218 may be activated and the voice search button 910 may provide visual feedback 932 to the user, as shown. In some embodiments, the microphone 218 may already be activated, depending on when the voice search initiation signal was sent. Haptic feedback may be provided to the user at various stages of the drag-and-hold gesture for the voice search button. Upon completion of voice input, the user may release the voice search button 910 and the voice search button 910 may rubberband in direction 934 to indicate completion of voice input. The user may cease voice input by releasing the voice search button 910 or by removing their finger from the touchscreen display of the device, in one example. In some embodiments, a voice transmission completion signal may be sent from the mobile device 900 to the media output device 400 upon detecting cessation of the drag-and-hold gesture, or when the user releases the voice search button, indicating that voice data transmission is complete.

At block 806, computer-executable instructions of the voice search module 234 may be executed to generate voice data representative of the analog sound input. The voice data may be digital data generated by analog-to-digital conversion of the sound input. At block 808, computer-executable instructions of the communication module 232 may be executed to transmit the generated voice data to a media output device in accordance with a wireless communication protocol, such as through a WiFi or Bluetooth connection, where the media output device is configured to communicate with a viewing device configured to display content. In an example embodiment, the generated voice data may be transmitted through a local area network to a media output device and from the media output device to the one or more servers through the Internet. At block 810, computer-executable instructions of the communication module 232 may be executed to receive, from the media output device and/or the remote server, an indication of a set of selectable candidate search options identified based at least in part on the voice data. The mobile device may present the set of selectable search options. In some embodiments, if a user may use the voice search button 910 to initiate a voice search, the search options and/or search results may be presented on a viewing device, such as a TV instead of at the mobile device. In such embodiments, the user may tap the search designation button 908 to select or designate the mobile device for presentation of the search options and/or search results. The mobile device may receive a selection of one of the selectable search options.

At block 812, computer-executable instructions of the communication module 232 may be executed to transmit, to the media output device and/or the remote server, the selected one of the set of search options for content searching. At block 814, the mobile device may receive an indication of a set of search results identified based at least in part on the selected search option. The set of search results may be presented at the mobile device and may include content selection options identified based on the generated voice data. The mobile device may receive a selection of one of the search results and, at block 816, the mobile device may transmit the selected search result to the media output device and/or the remote server.

At block 818, computer-executable instructions of the communication module 232 may be executed to receive, from the media output device and/or the remote server, metadata associated with the selected search result. At block 820, metadata associated with the selected search result is presented, for example on either or both of the display of the mobile device or a viewing device connected to the media output device.

It should be noted, that the method 800 may be modified in various ways in accordance with certain embodiments of the disclosure. For example, one or more operations of method 800 may be eliminated or executed out of order in other embodiments of the disclosure. Additionally, other operations may be added to method 800 in accordance with other embodiments of the disclosure.

The systems and methods described herein may allow users to seamlessly browse and/or search while current playback on the television is not disrupted or otherwise interrupted. The mobile device may provide users with a second screen that can be used to perform voice-based searching functions.

The above described example ranking and scoring determinations are merely examples and the implementations of the techniques disclosed herein are not so limited. As would be understood by one of ordinary skill in the art in view of this disclosure, any number of variations or alternative determination may be used without departing from the scope of this disclosure.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Program modules, applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

What is claimed is:

1. A method, comprising:
   receiving, by a computer system coupled to a television, a voice search initiation signal from a mobile device wirelessly connected to the computer system over a WiFi protocol connection or a Bluetooth protocol connection, wherein the computer system comprises one or more processors, one or more memory devices communicatively coupled to the one or more processors, a WiFi receiver, and a Bluetooth receiver;
   monitoring, by the computer system, the WiFi receiver and the Bluetooth receiver for first voice data that represents an audio signal captured by a microphone;
   receiving, by the computer system, the first voice data at the WiFi receiver;
   receiving, by the computer system, second voice data at the Bluetooth receiver while the first voice data is being received at the WiFi receiver;
   storing, by the computer system, the first voice data received via the WiFi receiver in at least one memory device of the one or more memory devices;
   discarding, by the computer system, the second voice data by denying a connection request from the Bluetooth receiver to communicate the second voice data;

transmitting, by the computer system, the first voice data received from the mobile device to a remote server for processing of the first voice data;
receiving a set of candidate search strings from the remote server identified from the processing of the first voice data; and
presenting information associated with the set of candidate search strings on a display of the television.

2. The method of claim 1, further comprising:
presenting, by the computer system, content on a display of the television; and
transmitting, by the computer system, the set of candidate search strings to the mobile device, wherein the information associated with the set of candidate search strings is presented on a display of the mobile device at least partially concurrently with presentation of the content on the display of the television.

3. The method of claim 1, further comprising:
receiving, by the computer system, an indication of a selection of a selected candidate search string of the set of candidate search strings;
transmitting the selected candidate search string to the remote server for content searching to identify content relevant to the selected candidate search string;
receiving content search results from the remote server corresponding to the selected candidate search string; and
presenting information identifying the content search results on the display of the television.

4. A method comprising:
receiving, by a server device, a voice search initiation signal from a client device in wireless communication with the server device;
receiving, by the server device, first voice data;
receiving, by the server device, second voice data while the first voice data is being received;
determining that an initial portion of the first voice data was received before an initial portion of the second voice data;
determining, by the server device, a first wireless communication protocol over which the first voice data is received;
determining, by the server device, a second wireless communication protocol over which the second voice data is being received; and
discarding, by the server device, the second voice data while the first voice data is being received, wherein the first wireless communication protocol is a WiFi protocol, and the second wireless communication protocol is a Bluetooth protocol.

5. The method of claim 4, further comprising:
receiving, by the server device, a voice transmission completion signal; and
storing, by the server device, the first voice data.

6. The method of claim 5, further comprising:
sending, by the server device, the first voice data to a remote server for processing of the first voice data;
receiving, by the server device, information associated with a set of candidate search options from the remote server identified from the processing of the first voice data, wherein the information associated with the candidate search options comprises text string queries; and
presenting the information associated with the set of candidate search options on a display of a viewing device communicatively coupled to the server device.

7. The method of claim 6, further comprising:
receiving, by the server device, an indication of a selected candidate search option of the set of candidate search options presented on the viewing device;
sending the selected candidate search option to the remote server for content searching to identify content relevant to the selected candidate search option;
receiving search results from the remote server corresponding to the selected candidate search option;
presenting information associated with the search results at the viewing device; and
presenting the information associated with the search results at the client device.

8. The method of claim 5, further comprising:
sending, by the server device, the first voice data to a remote server for processing of the first voice data;
receiving, by the server device, information associated with a set of candidate search options from the remote server identified from the processing of the first voice data, wherein the information associated with the candidate search options comprises audio queries;
presenting the information associated with the set of candidate search options via a speaker of a speaker device communicatively coupled to the server device;
receiving, by the server device, an audio indication of a selected candidate search option of the set of candidate search options presented on the speaker device;
sending the selected candidate search option to the remote server for content searching to identify content relevant to the selected candidate search option;
receiving search results from the remote server corresponding to the selected candidate search option; and
presenting information associated with identifying the search results at the speaker device.

9. The method of claim 4, wherein the client device is a first client device, and wherein the first voice data is received from the first client device and the second voice data is received from a second client device.

10. The method of claim 4, wherein receiving the voice search initiation signal from the client device in wireless communication with the server device is in response to detecting, at the client device, touch input from a user at a user interface of the client device, wherein the touch input corresponds to selection and dragging of a selectable element for initiating a voice search, and the voice search initiation signal is sent by the client device when the selectable element has been dragged a threshold amount across the user interface.

11. A media output device comprising:
at least one memory that stores computer-executable instructions; and
at least one processor configured to access the at least one memory and execute the computer-executable instructions to:
establish a WiFi protocol connection with a first mobile device;
establish a Bluetooth protocol connection with a second mobile device;
receive a voice search initiation signal from the first mobile device or the second mobile device;
associate a first connection over which the voice search initiation signal was received as an active connection;
receive first voice data over the first connection;
receive second voice data over a second connection that is associated as inactive while the first voice data is received over the first connection;

determine that an initial portion of the first voice data was received before an initial portion of the second voice data; and discard the second voice data, wherein the first connection is the WiFi connection, and the second connection is the Bluetooth connection.

12. The device of claim 11, wherein the at least one processor is further configured to access the at least one memory and execute the computer-executable instructions to:

send the first voice data to a remote server for processing of the first voice data;

receive an indication of a set of search options from the remote server identified from the processing on the first voice data; and present information associated with the set of search options at a viewing device in communication with the media output device.

13. The device of claim 12, wherein the at least one processor is further configured to access the at least one memory and execute the computer-executable instructions to send the information associated with the set of search options to either the first mobile device or the second mobile device.

14. The device of claim 12, wherein the at least one processor is further configured to access the at least one memory and execute the computer-executable instructions to:

receive an indication of a selected search option of the set of search options;

send the selected search option to the remote server for content searching to identify relevant content; and receive a set of search results from the remote server corresponding to the selected search option.

15. The device of claim 11, wherein the at least one processor is further configured to access the at least one memory and execute the computer-executable instructions to:

send the first voice data to a remote server for processing of the first voice data;

receive an indication of a set of search options from the remote server identified from the processing on the first voice data; and present information associated with the set of search options via audio at a speaker device in communication with the media output device.

16. The device of claim 15, wherein the at least one processor is further configured to access the at least one memory and execute the computer-executable instructions to: receive an indication of a selected search option of the set of search options, wherein the indication is provided via first voice input;

send the selected search option to the remote server for content searching to identify relevant content;

receive a set of search results from the remote server corresponding to the selected search option;

present information associated with the set of search results at the speaker device;

receive an indication of a selected search result via second voice input; and present content associated with the selected search result at the speaker device.

\* \* \* \* \*

UNITED STATES PATENT AND TRADEMARK OFFICE
CERTIFICATE OF CORRECTION

PATENT NO. : 10,999,636 B1  
APPLICATION NO. : 14/537893  
DATED : May 4, 2021  
INVENTOR(S) : Richard W. Kim et al.

Page 1 of 1

It is certified that error appears in the above-identified patent and that said Letters Patent is hereby corrected as shown below:

On the Title Page

In Column 1, item (72) the Inventors section, Line 4, the name "Olsen" should be changed to
-- Olson --.

Signed and Sealed this
Tenth Day of May, 2022

Katherine Kelly Vidal
*Director of the United States Patent and Trademark Office*